US009264147B2

(12) United States Patent
Caplan et al.

(10) Patent No.: US 9,264,147 B2
(45) Date of Patent: Feb. 16, 2016

(54) METHOD AND APPARATUS FOR PHASE SHIFT KEYED OPTICAL COMMUNICATIONS

(75) Inventors: David O. Caplan, Westford, MA (US); Neal W. Spellmeyer, Arlington, MA (US); Bryan S. Robinson, Arlington, MA (US); Scott A. Hamilton, Lexington, MA (US); Don M. Boroson, Needham, MA (US); Hemonth G. Rao, Bedford, MA (US); Marc C. Norvig, Melrose, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 182 days.

(21) Appl. No.: 13/071,460

(22) Filed: Mar. 24, 2011

(65) Prior Publication Data

US 2011/0274429 A1  Nov. 10, 2011

Related U.S. Application Data

(60) Provisional application No. 61/317,084, filed on Mar. 24, 2010.

(51) Int. Cl.
*H04B 10/00* (2013.01)
*H04B 10/67* (2013.01)
(Continued)

(52) U.S. Cl.
CPC .......... *H04B 10/677* (2013.01); *H04B 10/5561* (2013.01); *H04L 27/2075* (2013.01); *H04L 27/2096* (2013.01); *H04L 27/223* (2013.01); *H04L 27/2601* (2013.01)

(58) Field of Classification Search
CPC .......... H04B 10/40; H04B 10/50; H04B 10/60
USPC .................................................. 398/140, 162
See application file for complete search history.

(56) References Cited

U.S. PATENT DOCUMENTS

| 6,396,605 B1 | 5/2002 | Heflinger et al. |
| 6,661,975 B1 * | 12/2003 | Hall ..................... H04B 10/118 398/177 |

(Continued)

FOREIGN PATENT DOCUMENTS

| WO | WO 02/091645 A | 11/2002 |
| WO | WO 2006/071744 A1 | 7/2006 |

(Continued)

OTHER PUBLICATIONS

"Pair", www.merriam-webster.com/dictionary/pair retrieved (May 21, 2013), pp. 1-4.*

(Continued)

*Primary Examiner* — Daniel Dobson
(74) *Attorney, Agent, or Firm* — Hamilton, Brook, Smith & Reynolds, P.C.

(57) ABSTRACT

A burst-mode phase shift keying (PSK) communications system according to an embodiment of the present invention enables practical, power-efficient, multi-rate communications between an optical transmitter and receiver. Embodiments may operate on differential PSK (DPSK) signals. An embodiment of the system utilizes a single interferometer in the receiver with a relative path delay that is matched to the DPSK symbol rate of the link. DPSK symbols are transmitted in bursts, and the data rate may be varied by changing the ratio of the burst-on time to the burst-off time. This approach offers a number of advantages over conventional DPSK implementations, including near-optimum photon efficiency over a wide range of data rates, simplified multi-rate transceiver implementation, and relaxed transmit laser line-width requirements at low data rates.

67 Claims, 19 Drawing Sheets

(51) Int. Cl.
| | |
|---|---|
| *H04B 10/556* | (2013.01) |
| *H04L 27/20* | (2006.01) |
| *H04L 27/22* | (2006.01) |
| *H04L 27/26* | (2006.01) |

(56) References Cited

U.S. PATENT DOCUMENTS

| | | | |
|---|---|---|---|
| 6,694,104 B1* | 2/2004 | Caplan et al. | 398/197 |
| 6,785,446 B1 | 8/2004 | Chandrasekhar et al. | |
| 6,826,371 B1 | 11/2004 | Bauch et al. | |
| 6,831,779 B2 | 12/2004 | Caplan | |
| 7,035,543 B1 | 4/2006 | Hoshida et al. | |
| 7,181,097 B2 | 2/2007 | Caplan et al. | |
| 7,233,430 B2 | 6/2007 | Caplan | |
| 7,411,726 B2 | 8/2008 | Caplan | |
| 7,414,728 B2 | 8/2008 | Caplan | |
| 7,986,878 B2 | 7/2011 | Saunders et al. | |
| 2004/0258423 A1 | 12/2004 | Winzer | |
| 2005/0031347 A1* | 2/2005 | Soto | H04B 10/2503 398/58 |
| 2005/0185968 A1 | 8/2005 | Dorrer et al. | |
| 2005/0260000 A1 | 11/2005 | Domagala | |
| 2006/0056845 A1 | 3/2006 | Parsons et al. | |
| 2006/0268704 A1 | 11/2006 | Ansari et al. | |
| 2006/0274320 A1 | 12/2006 | Caplan | |
| 2007/0104493 A1* | 5/2007 | Kimura | 398/202 |
| 2007/0206963 A1* | 9/2007 | Koc | 398/202 |
| 2007/0216988 A1* | 9/2007 | Caplan | 359/325 |
| 2008/0137179 A1* | 6/2008 | Li et al. | 359/337.13 |
| 2009/0136240 A1* | 5/2009 | Malouin et al. | 398/183 |
| 2009/0196602 A1* | 8/2009 | Saunders et al. | 398/26 |
| 2009/0297162 A1 | 12/2009 | Kai et al. | |
| 2010/0034534 A1 | 2/2010 | Niibe et al. | |
| 2010/0061729 A1* | 3/2010 | Weeber | 398/71 |
| 2010/0232795 A1 | 9/2010 | Wang et al. | |
| 2010/0266291 A1* | 10/2010 | Boffi et al. | 398/159 |
| 2012/0281990 A1 | 11/2012 | Caplan | |

FOREIGN PATENT DOCUMENTS

| | | |
|---|---|---|
| WO | WO 2007/103410 A2 | 9/2007 |
| WO | WO 2008/118411 A1 | 10/2008 |
| WO | WO 2011/119897 A2 | 9/2011 |
| WO | WO 2013/015859 A2 | 1/2013 |

OTHER PUBLICATIONS

IEEE 100 The Authoritative Dictionary of IEEE Standards Terms, 2000, Standards Information Network IEEE Press, 7th Edition, pp. 272, 1200.*

Agrawal, G. P., *Nonlinear Fiber Optics, Second Edition* (New York: Academic Press)(1995).

Alexander, S. B., *Optical Communication Receiver Design* (Bellingham, WA: SPIE Press) (1997).

Andersson, P. O., and Akermark, K., "Accurate optical extinction ratio measurements," *IEEE Photonics Technology Letters*, 6(11): 1356-1358 (1994).

Andrews, L.C., and Phillips, A. J., *Laser Beam Propagation through Random Media*, 2nd Edition (Bellingham, WA: SPIE Press) (2005).

Cai, J.-X., et al., "A DWDM Demonstration of 3.73 Tb/s over 11,000 km using 373 RZ-DPSK channels at 10 Gb/s." Paper PD22 presented at OFC Conference (2003). 3 pages.

Caplan, D. O., et al., "High-Sensitivity Variable-Rate Transmit/Receive Architecture," *IEEE*, pp. 297-298 (1999).

Caplan, D. O., et al., "Demonstration of 2.5-Gslot/s optically-preamplified M-PPM with 4 photons/bit receiver sensitivity." Paper PDP32 presented at OFC Conference (2005). 2 pages.

Caplan, D. O., "Laser Communication Transmitter and Receiver Design," in *J. Opt. Fiber. Communications*, Rep. 4, pp. 225-362 (2007).

Cerf, V., "Internet and the High Capacity Challenge," Plenary Speaker, SVP Internet Architecture World Com, 30 pages, Mar. 19, 2002.

Edwards, C. D., et al., "NASA's Deep Space Telecommunications Road Map," (Telecom. and Mission Ops. Progress Report 42-136). Jet Propulsion Laboratory (1999). pp. 1-20.

Forney, G. D., Jr., "Burst-correcting codes for the classic bursty channel," *IEEE Trans. Comm. Technol.*, 19(5): 772-781 (1971).

Gnauck, A. H., et al., "2.5 Tb/s (64×42.7 Gb/s) transmission over 40×100 km NZDSF using RZ-DPSK format and all-Raman-amplified spans." Paper FC2 presented at OFC Conference (2002). 3 pages.

Hewlett Packard, "Measuring extinction ratio of optical transmitters," Application Note 1550-8 (1998).

Kobayashi, S., and Fukada, Y., "A Burst-mode Packet Receiver with Bit-rate-discriminating Circuit for Multi-bit-rate Transmission System." Paper WX4 presented at LEOS (1999). pp. 595-596.

Kobayashi, S., and Hashimoto, M., "A Multibitrate Optical Burst-mode Packet Receiver." Paper TuD4 presented at LEOS (2001). pp. 165-166.

Liu, F., et al., "Experimental verification of a new model describing the influence of incomplete signal extinction ratio on the sensitivity degradation due to multiple interferometric crosstalk," *IEEE Photonics Technology Letters*, 11(1): 137-139 (1999).

Mendenhall, J. A., et al., "Design of an Optical Photon Counting Array Receiver System for Deep Space Communications," *Proc. IEEE*, 95(10): 2059-2069 (2007).

Miyamoto, Y., et al., "S-band WDM coherent transmission of 40×43-Gbit/s CS-RZ D signals over 400 km DSF using hybrid GS-TDFAs/Raman amplifiers," *Electron. Lett.*, 38(24): 1569-1570 (2002).

Mizuochi, T., et al., "Forward error correction based on block turbo code with 3-bit soft decision for 10-Gb/s optical communication systems," *IEEE J. Sel. Top Quantum Electron.*, 10(2): 376-386 (2004).

"NASA Space Communication and Navigation Architecture Recommendations for 2005-2030," (Space Communication Architecture Working Group Final Report). www.spacecomm.nasa.gov/spacecomm (2006).

Rasmussen, C., et al., "DWDM 40G transmission over trans-Pacific distance (10 000 km) using CSRZ-DPSK, enhanced FEC and all-Raman amplified 100 km Ultrawave fiber spans." Paper PD18 presented at OFC (2003).

Shinagawa, T., et al. "Detailed investigation on reliability of wavelength-monitor-integrated fixed and tunable DFB laser diode modules," *J. Lightwave Technology*, 23(3): 1126-1136 (2005).

Smutny, B., et al., "5.6 Gbps optical intersatellite communication link," *Proc. SPIE*, 7199(6): 1-8 (2009).

Stevens, M. L., et al., "A novel variable-rate pulse-position modulation system with near quantum limited performance." PaperTuU5 presented at LEOS (1999). 2 pages.

Stevens, M. L., et al., "Optical Homodyne PSK Demonstration of 1.5 Photons per Bit at 156 Mbps with Rate-1/2 Turbo Coding," *Opt. Express*, 16(14): 10412-10420 (2008).

Swanson, E. A., et al., "High sensitivity optically preamplified direct detection DPSK receiver with active delay-line stabilization," *IEEE Photonics Technology Letters*, 6(2): 263-265 (1994).

Townes, S. A., et al., "The Mars laser communication demonstration." Paper presented at IEEE Aerospace Conf. (2004). pp. 1-15.

Walther, F. G., et al., "A Process for Free-Space Laser Communications System Design," *Proc. SPIE*, 7464(V): 1-9 (2009).

Zhu, B., et al., "6.4 Tb/s (160×42.7 Gb/s) transmission with 0.8 bit/s/Hz spectral efficiency over 32×100 km of fiber using CSRZ-DPSK format." Paper PD19 presented at OFC Conference (2003). 3 pages.

Ajmal, T., et al., "Design of a 10 Gbps Optical Burst Mode DPSK Receiver for Data and Clock Recovery." Paper presented at ECOC (2008).

Caplan, D, O., et al., "Demonstration of Optical DPSK Communication with 25 Photons/Bit Receiver Sensitivity." Paper CFH5 presented at CLEO (2006).

Caplan, D.O., et al., "Free-space Lasercom: Global Communications and Beyond." Presentation slides from ECOC (2009).

Caplan, D. O., et al., "High-Sensitivity Demodulation of Multiple-Data-Rate WDM-DPSK Signals using a Single Interferometer." Paper OThD3 presented at OFC (2007).

(56) References Cited

OTHER PUBLICATIONS

Caplan, D. O., et al., "High-sensitivity multi-channel single-interferometer DPSK receiver," *Optics Express*, 14(23): 10984-10989 (2006).
Caplan, D. O., et al., "Performance of high-rate high-sensitivity optical communications with forward error correction coding." Paper CPDD9 presented at CLEO (2004).
Caplan, D. O., et al., "Ultra-long Distance Free Space Laser Communications." Paper CWM1 presented at CLEO (2007).
Caplan, D. O., et al., "Ultra-wide-range Multi-rate Differential Phase Shift Keying (DPSK) Laser Communications." Presentation slides from CLEO (2010).
Caplan, D. O., et al., "Ultra-wide-range Multi-rate DPSK Laser Communications." Paper presented at OFC (2010).
Caplan, D. O., "DPSK Low-Rate Options," (Program 1804). MIT Lincoln Laboratory (2009).
Choi, Z.-Y., and Lee, Y.-H., "Compensating Frequency Drift in DPSK Systems via Baseband Signal Processing," *IEEE Transactions on Communications*, 45(8): 921-924 (1997).
Franklin, J., et al., "Generation of RZ-DPSK using a Chirp-Managed Laser (CML)." Paper JWA67 presented at OFC/NFOEC (2008).
Gnauck, A. H., and Winzer, P. J., "Optical Phase-Shift-Keyed Transmission," *Journal of Lightwave Technology*, 23(1): 115-130 (2005).
Ikura, M., and Adachi, F., "Baseband Feedforward Frequency Drift Compensation without False Phase Locking for Burst DPSK Signal Reception," *Electronics Letters*, 28(12): 1165-1167 (1992).
Kahn, J. M, and Ho, K.-P., "Spectral Efficiency Limits and Modulation/Detection Techniques for DWDM Systems," *IEEE Journal of Selected Topics in Quantum Electronics*, 10(2): 259-272 (2004).
Kazovsky, L. G., "Balanced Phase-Locked Loops for Optical Homodyne Receivers: Performance Analysis, Design Considerations, and Laser Linewidth Requirements," *Journal of Lightwave Technology*, LT-4(2): 182-195 (1986).
Kurumida, J., et al., "Simultaneous Multi-Format RZ-OOK and RZ-DPSK Optical Packet Switching Based on Tunable Four-Wave Mixing." Paper presented at IEEE Photonics Switching Conference (2009).
Livas, J. C., "High Sensitivity Optically Preamplified 10 Gb/s Receivers." Paper PD4 presented at OFC (1996).
Minch, J. R., et al., "Adaptive Transceivers for Mobile Free-Space Optical Communications." Paper presented at IEEE MILCOM (2006).
Minch, J. R., et al., "Rate Adjustable NRZ-DPSK Modulation Scheme with a Fixed Interferometer," *2005 Digest of the LEOS Summer Topical Meetings*, pp. 43-44.
Nishizawa, H., et al., "10-Gb/s Optical DPSK Packet Receiver Proof Against Large Power Fluctuations," *IEEE Photonics Technology Letters*, 11(6): 733-735 (1999).
"Notification Concerning Transmittal of International Preliminary Report on Patentability (Chapter I of the Patent Cooperation Treaty)" for International Application No. PCT/US2011/029882 entitled: Phase Shift Keyed Optical Communications, mailed on Oct. 4, 2012.
"Notification of Transmittal of the International Search Report and the Written Opinion of the International Searching Authority, or the Declaration" for International Application No. PCT/US2011/029882 entitled: Phase Shift Keyed Optical Communications, mailed on Oct. 24, 2011.
Olmos, J. J. V., et al., "Self-Controlled All-Optical Label and Payload Separator for Variable Length Bursts in a Time-Serial IM/DPSK Scheme," *IEEE Photonics Technology Letters*, 17(8): 1692-1694 (2005).
Olmos, J. J. V., et al., "Self-controlled All-Optical label and payload separator for variable length bursts in a Time-Serial IM/DPSK Scheme." Paper OTuC6 presented at OFC (2005).
Ota, Y., and Swartz, R. G., "Burst-Mode Compatible Optical Receiver With a Large Dynamic Range," *Journal of Lightwave Technology*, 8(12): 1897-1903 (1990).
Ota, Y., et al., "High-Speed, Burst-Mode, Packet-Capable Optical Receiver and Instantaneous Clock Recovery for Optical Bus Operation," *Journal of Lightwave Technology*, 12(2): 325-331 (1994).

Robinson, B. S., et al., "781-Mbit/s photon-counting optical communications using a superconducting nanowire detector," *Opt. Lett.*, 31(4): 444-446 (2006).
Spellmeyer, N. W., et al., "High-Sensitivity 40-Gb/s RZ-DPSK With Forward Error Correction," *IEEE Photonics Technology Letters*, 16(6): 1579-1581 (2004).
Su, C., et al., "Inherent Transmission Capacity Penalty of Burst-Mode Receiver for Optical Multiaccess Networks," *IEEE Photonics Technology Letters*, 6(5): 664-667 (1994).
Su, Y., et al., "Wide Dynamic Range 10-Gb/s DPSK Packet Receiver Using Optical-Limiting Amplifiers," *IEEE Photonics Technology Letters*, 16(1): 296-298 (2004).
Vodhanel, R. S., and Elrefaie, A. F., "Performance of direct frequency modulation DFB lasers in multigigabit per second ASK, FSK, and DPSK lightwave systems." Paper TUI6 presented at OFC (1990).
Essiambre, R.-J., et al., "Capacity Limits of Optical Fiber Networks", *Journal of Lightwave Technology*, 28(4): 662-701 (2010).
Fukushima, M., et al., "Recent Progress of Erbium-Doped Fiber Amplifiers and Their Components", *Proc. of SPIE*, 6775: 12 pages (2007).
Gordon, J.P., "Random Walk of Coherently Amplified Solitons in Optical Fiber Transmission", *Optics Letters*, 11(10): 665-667 (1986).
*Optical Fiber Telecommunications IIIA*, I.P. Kaminow and T.L. Koch, eds. (CA: Academic Press), 627 pages (1997).
Sun, Y., et al., "Optical Fiber Amplifiers for WDM Optical Networks", *Bell Labs Technical Journal*, pp. 187-206 (Mar. 1999).
Atia, W.A., and Bondurant, R.S., "Demonstration of Return-to-Zero Signaling in Both OOK and DPSK Formats to Improve Receiver Sensitivity in an Optically Preamplified Receiver," in Proc. LOES 12th Annual Meeting, vol. 1, 226-227 (1999), paper TuM3.
Caplan, D.O., et al., "Parallel Direct Modulation Laser Transmitters for High-speed High-sensitivity Laser Communications," in *CLEO: 2011—Laser Applications to Photonic Applications*, OSA Technical Digest (CD) (Optical Society of America, 2011), Post deadline paper PDPB12.
Caplan, D.O., et al., "Performance of High-Rate High-Sensitivity Optical Communications with Forward Error Correction Coding," CLEO, CPDD9, May 2004.
Charlet, G., et al., "6.4 Tb/s (159×42.7Gb/s) Capacity Over 21×100 km Using Bandwidth-Limited Phase-Shaped Binary Transmission," in Proc. ECOC 2002, Postdeadline Paper PD4.1, (2002).
Gnauck, A. H., et al., "Optical Duobinary Format From Demodulation of DPSK Using Athermal Delay Interferometer," IEEE Photonics Tech. Lett., 18(4) 637-639 (2006).
Gnauck, A.H., et al., "2.5 Tb/s (64×42.7 Gb/s) Transmission Over 40×100 km NZDSF Using RZ-DPSK Format and All-Raman-Amplified Spans," in Proc. OFC, 2002, paper FC2-1.
Gnauck, A.H., et al., "25×40-Gb/s Copolarized DPSK Transmission Over 12×100-km NZDF With 59-Ghz Channel Spacing," IEEE Photonics Technology Letters, vol. 15, No. 3, 467-469 (Mar. 2003).
Gnauk, A.H., et al., "Demonstration of 42.7-Gb/s DPSK Receiver with 45 Photons/Bit Sensitivity," IEEE Photonics Technology Letters, vol. 15, No. 1, 99-101 (Jan. 2003).
Griffin, R. A., et al., "10 Gb/s optical differential quadrature phase shift key (DQPSK) transmission using GaAs/AlGaAs integration," in OFC, 2002.
Grosz, D.F., et al., "5.12 Tb/s (128×42.7 Gb/s) Transmission with 0.8 bit/s/Hz Spectral Efficiency Over 1280 km of Standard Single-Mode Fiber Using All-Raman Amplification and Strong Signal Filtering," in Proc. ECOC 2002, Postdeadline paer PD4.3, (2002).
Hernandez, V.J., et al., "Performance Impact of Multiple Access Interference in a 4-ary Pulse Position Modulated Optical Code Division Multiple Access (PPM/O-CDMA) System," *Proc. IEEE Optical Fiber Communications Conf. (OFC)*, pp: 1652-1654 (2008).
Hsieh, Y. C., et al., "Athermal Demodulator for 42.7-Gb/s DPSK Signals," in ECOC 2005 Proceedings—vol. 4., Glasgow, U.K., 2005, Paper Th 1.5.6.
Hung, W., et al., "An Optical Network Unit for WDM Access Networks with Downstream DPSK and Upstream Remodulated OOK Data Using Injection-Locked FP Laser," IEEE Photonics Technology Letters, v. 15, No. 10, 1476-1478, (Oct. 2003).

(56) References Cited

OTHER PUBLICATIONS

IEEE 100The Authoritative Dictionary of IEEE Standard Terms, 2000, Standards Information Network IEEE Press, 7th Edition, pp. 272, 1200.

Kim, Hoon, "Cross-Phase-Modulation-Induced Nonlinear Phase Noise in WDM Direct-Detection DPSK Systems," Journal of Lightwave Technology, vol. 21, No. 8, 1770-1774 (Aug. 2003).

Leng, L., et al., "1.6 Tb/s(40 × 40 Gb/s) Transmission Over 500 km of Nonzero Dispersion Fiber with 100-km Amplified Spans Compensated by Extra-High-Slope Dispersion-Compensating Fiber," In Proc. OFC 2002.

Liu, F., et al., "1.6 Tbit/s (40×42.7 Gbit/s) Transmission Over 3600 km UltraWave™ Fiber with all-Raman Amplified 100 km Terrestrial Spans Using ETDM Transmitter and Receiver," in Proc. OFC 2002, paper FC7-1.

Liu, Xiang, et al., "Athermal Optical Demodulator for OC-768 DPSK and RZ-DPSK Signals," IEEE Phtonics Technology Letters, 17(12) 2610-2612 (2005).

Mendez, A.J., et al., "Comparison of WDM/Pulse-Position-Modulation (WDM/PPM) with Code/Pulse-Position-Swapping (C/PPS) Based on Wavelength/Time Codes," *Avionics, Fiber-Optics and Photonics Conference* (2009).

Mendez, A.J., et al., "Design and Evaluation of a Virtual Quadrant Receiver for 4-ary Pulse Position Modulation/Optical Code Division Multiple Access (4-ary PPM/O-CDMA)," *Proc. SPIE* 6457, 64570H 1-6 (2007).

Mendez, A.J., et al., "Design of Optical Pulse Position Modulation (PPM) Translating Receiver," *Proc. IEEE Photonics Society Annual Meeting LEOS*, pp. 18-19, (Oct. 2009).

Mendez, A.J., et al., "Transmitter and Translating Receiver Design for 64-ary Pulse Position Modulation (PPM)," *Proc. SPIE 7587, 75870M* (2010).

Mendez, A.J., et al., "Virtual Array Receiver Options for 64-ary Pulse Position Modulation (PPM)," *in Proc. SPIE 7199*, pp. 71990S-1-8 (2009).

Onohara, K., et al., "Soft-Decision-Based Forward Error Correction for 100 Gb/s Transport Systems," *IEEE Journal of Selected Topics in Quantum Electronics*, vol. 16 (5) pp: 1258-1267 (2010).

Rhee, J.K., et al., "DPSK 32×10 Gb/s Transmission Modeling on 5×90 km Terrestrial System," IEEE Photonics Technology Letters, vol. 12, No. 12, 1627-1629 (Dec. 2000).

Rohde, M., et al., "Robustness of DPSK Direct Detection Transmission Format in Standard Fibre WDM Systems," Electronics Letters, vol. 36, No. 17, 1483-1484, (Aug. 2000).

Stevens, M.L, et al., "A simple delay-line 4-PPM demodulator with near-optimum performance," *Optics Express*, vol. 20 (5) pp: 5270-5280 (Feb. 27, 2012).

Su., C., et al., "Theory of Burst-Mode Receiver and Its Applications in Optical Multiaccess Networks," Journal of Lightwave Technology, 15(4): 590-606 (1997).

Vassilieva, O., et al., "Numerical Comparison of NRZ, CS-RZ and IM-DPSK Formats in 43Gbit/s WDM Transmission," in Proc. LEOS 14th Annual Meeting, (2001), paper ThC2.

Xu, C., et al., "Differential Phase-Shift Keying for High Spectral Efficiency Optical Transmissions," IEEE Journal of Selected Topics in Quantum Electronics, vol. 10, No. 2, 281-293 (Mar./Apr. 2004).

Yonenaga, K., et al.,"10-Gbit/s x Four-Channel WDM Transmission Experiment Over 2400-km DSF Using Optical DPSK Direct Detection Scheme," in Proc. OFC 97, 331-332. (1997), paper Th52.

Yonenaga, K., et al., "Reduction of four-wave mixing induced penalty in unequally spaced WDM transmisstion system by using optical DPSK," Electronics Letters, 32(23): 2118-2119 (1996).

Zhu, B., et al., "72-nm Continuous Single-Band Transmission of 3.56 Tb/s (89×42.7 Gb/s) Over 4000 km of NZDF Fiber," in Proc. ECOC-IOOC 2003.

Zhu, B., et al., "Transmission of 3.2 Tb/s (80×42.7 Gb/s) Over 5200 km of UltraWave™ Fiber with 100-km Dispersion-Managed Spans Using RZ-DPSK Format," in Proc. ECOC 2002, Postdeadline Paper PD4.2, (2002).

* cited by examiner

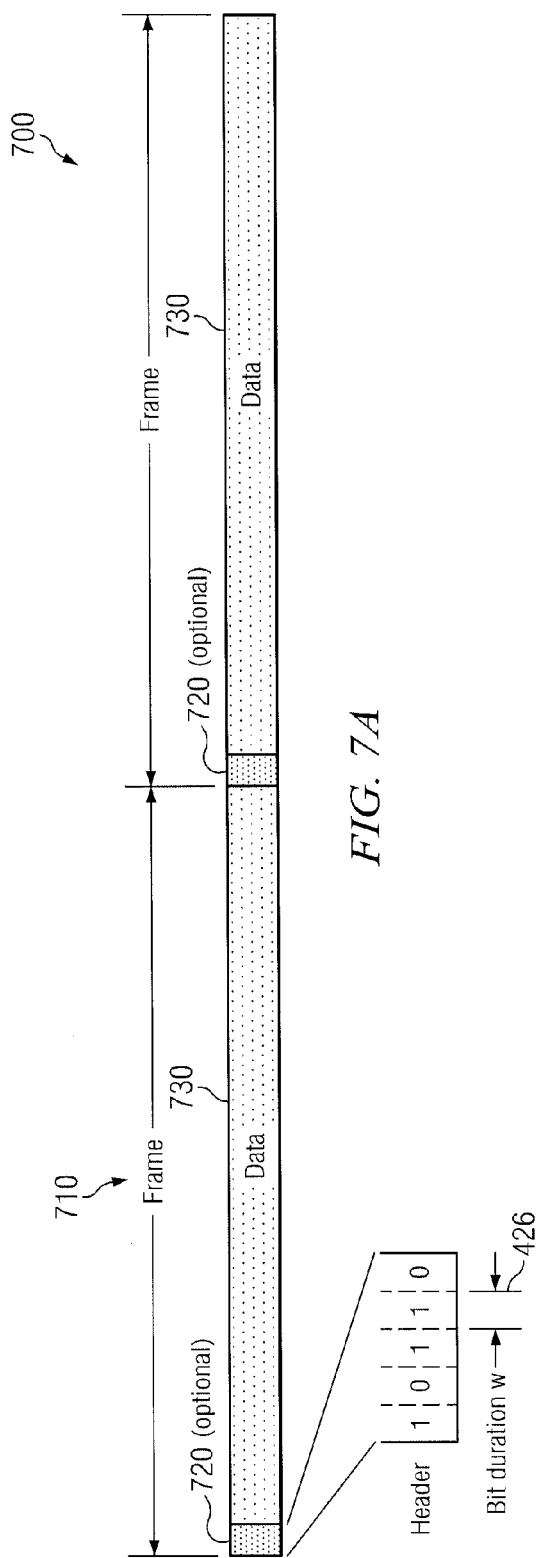
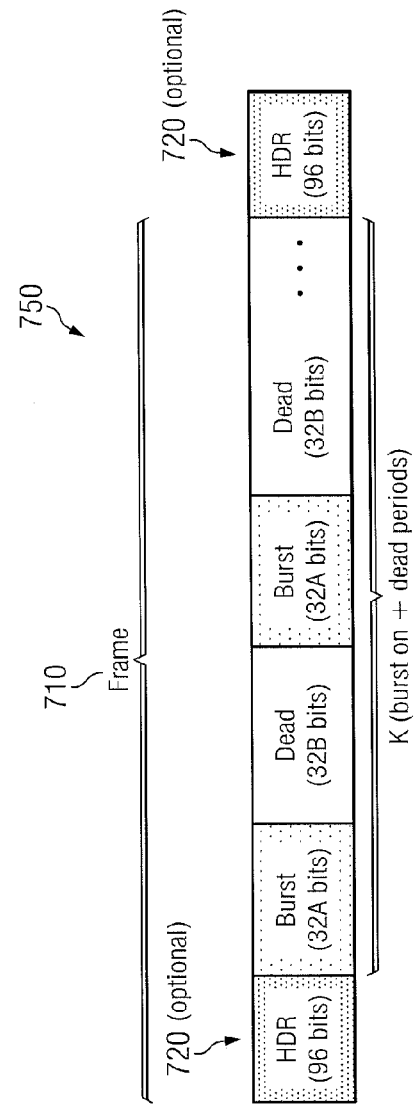
FIG. 7A
FIG. 7B

METHOD AND APPARATUS FOR PHASE SHIFT KEYED OPTICAL COMMUNICATIONS

RELATED APPLICATION

This application claims the benefit of U.S. Provisional Application No. 61/317,084, filed on Mar. 24, 2010, entitled "Phase-Shift Keyed Transmitters and Receivers." The entire teachings of the above application are incorporated herein by reference.

GOVERNMENT SUPPORT

The invention was made with Government support under Contract No. FA8721-05-C-0002 awarded by the U.S. Airforce. The Government has certain rights in the invention.

BACKGROUND OF THE INVENTION

Optical Phase-shift keyed (PSK) modulation formats have great utility for optical communications because of their suitability for high-speed long-haul transmission, with good spectral and photon efficiency. Good photon efficiency is important for free space communications applications which may often be limited by channel loss rather than, for example, dispersive properties of a guided channel. PSK modulation formats are also suitable for use with coherent receivers that may achieve even higher efficiency and mitigate dispersive channel effects. Commercial systems incorporating PSK modulation are being deployed to support data rates at 10 Gbps and beyond.

For communications systems that operate over dynamically changing channel conditions, it is useful to support operations over a range of data rates in order to provide features such as fall-back modes of operation and bandwidth on-demand, which may help increase overall channel throughput.

Differentially encoded PSK (DPSK) receivers commonly use interferometric demodulators, such as optical delay-line interferometers (DIs), to perform a phase comparison between differentially encoded symbols. Typically, the DI delay $\tau_d$ is equal to one symbol period $\tau_s$ or an integer multiple of the symbol period $n\tau_s$, in which the phase comparison is performed on non-adjacent symbols separated by multiple symbols. The use of non-adjacent (NA) demodulation techniques enables transmitter and receiver implementations that may operate a multiple rates that are integer submultiples of the DI delay, or, equivalently, rates that are integer multiples of the DI free spectral range (FSR), where FSR=$1/\tau_d$, Rate (n)=nFSR=$n/\tau_d$, and $n$ is an integer rate multiplier. The FSRs of commercially available DIs range from ~2 GHz to many tens of GHz (and beyond). Since larger FSRs correspond to smaller DI delays, DI packaging is often simplified and size-reduced with increasing FSR. In addition, smaller size DIs are typically easier to stabilize, which is beneficial in communication applications where the DI alignment and stability have a big impact on receiver sensitivity. Using commercially available DIs, multi-rate NA-DPSK demodulation techniques may operate at rates above the few Gbps regime, e.g, 2 Gbps, 4 Gbps, . . . , 10 Gbps, and beyond. Alternative multi-rate DPSK reception techniques include the use of multiple interferometers, each for a different data rate, though this approach is unattractive from a standpoint of size, cost, and complexity.

SUMMARY OF THE INVENTION

An embodiment of the present invention is an optical communications system employing an optimal transmitter/receiver pair configured, or operable to be configured, to operate at a selectable data rate with data transmitted in bursts, where the data rate is a function of a burst-on duty cycle.

The data transmitted in bursts may be accompanied by a periodic header or other signal which the receiver may use as a synchronization signal bursts. The system may operate on differentially encoded phase-shift keying signals, in which case the receiver may use a fixed interferometric demodulator.

The data rate may be adjusted, depending on channel conditions, to accommodate transmission rate, throughput, security at the receiver, or signal-to-noise ratio. The receiver or an external manager may send data via a return link or supervisory channel to change the rate at which the transmitter transmits data.

The transmitter may employ an interleaver configured to spread out data bits in time, and the receiver may include a de-interleaver configured to perform the inverse function.

The burst-on length may be selectable. The burst-off time may be less than or equal to 100 microseconds. The transmission extinction ratio may be greater than the burst-on duty cycle plus 3 dB.

In some embodiments, the transmitter is average power limited. Further, in some embodiments, the penalty may be less than 2 dB for a range of duty cycles of greater than 25 dB.

The transmitter and receiver may include substantially matched filters, and the receiver may further include a high gain preamplifier and, optionally, a polarization filtering element. In some embodiments, the receiver is configured to learn error rate from a header or forward error correction data independent of the transmitter and may be further configured to use the error rate internally or notify the transmitter of the error rate. The receiver may be an interferometric receiver that is pilot tone stabilized. Alternatively, the receiver may be phase sensitive or a coherent receiver. In the case of a coherent receiver, the coherent receiver may be configured to receive a signal with a modulation selected from a group consisting of: M-PSK, M-QAM, polarization modulation, OFDM, polarization multiplexing, WDM, or combination thereof.

In an example embodiment, the transmitter/receiver pair may be configured to use forward error correction coding and interleaving. The transmitter and receiver may be configured to communicate via a free space medium, guided wave channel, or guided wave channel that is a multimode guided wave channel.

In some embodiments, the transmitter/receiver pair is configured to communicate up to a maximum rate equal to a free spectral range of an interferometric-based receiver demodulator, and the pair may be still further configured to communicate at lower rates by fractions equal to the burst-on duty cycle.

In some embodiments, the duty cycle may be 100 percent, and the data rate may be increased using non-adjacent differential phase shift keying (DPSK) signaling.

The transmitter may use a linewidth of a transmitter laser that is greater than or equal to 0.1% of the data rate. Misalignment of the interferometric-based receiver and incoming wavelength may be less than 5% of the free spectral range in one embodiment, and may be greater than 1% of the selected data rate in an alternative embodiment.

The transmitter may include a single modulator configured to perform pulse carving, data modulating, and window modulating, or combination of at least two thereof.

The receiver may include a preamplifier with adjustable gain (interchangeably referred to herein as selectable gain) to enable preamplification without saturation. The preamplifier may also be configured to avoid saturation penalties and extend dynamic range as a function of the duty cycle.

The transmitter/receiver pair may be components in a bi-directional system of transceiver pairs. In some embodiments, the transmitter/receiver pair may be configured to communicate using at least one of the following modulation formats: wavelength division multiplexing (WDM), differential phase shift keying (DPSK), pulse position modulation (PPM), or pulse code modulation (PCM). Other examples of modulation formats that may be utilized by embodiments of the present invention are disclosed herein.

It should be understood that the foregoing description of example systems may likewise be implemented in the form of a method. For example, an embodiment of a method according to the present invention may include transmitting at a selectable data rate with data transmitted in bursts, the data rate being a function of a burst-on duty cycle and may also include receiving the data at the selectable data rate.

Another embodiment of the present invention includes an apparatus having a transmitter configured, or operable to be configured, to transmit at a selectable data rate with data transmitted in bursts, where the data rate is a function of a burst-on duty cycle. In such an embodiment, the many combinations described above with respect to the transmitter in the system embodiment also apply here to the transmitter in the apparatus embodiment.

The receiver may be a non-coherent optical receiver or may be a coherent optical receiver.

In the case of a non-coherent optical receiver, the optical communications receiver may include a high gain optical amplifier configured, or operable to be configured, to operate in saturation or selectable gain mode. The optical receiver may also include a filter substantially matched, or operable to be substantially matched, to an expected incoming waveform. The optical receiver may further include an interferometric demodulator configured, or operable to be configured, to operate at a data rate below its free spectral range, where the data rate is a function of a burst-on duty cycle of the expected incoming waveform.

Like the optical transmitter, the non-coherent optical receiver may be implemented in many forms, such as those described above in reference to the system embodiment. For example, the non-coherent optical receiver may receive the data in bursts accompanied by a periodic header. The filter may further include a polarization aligned to the incoming waveform. The non-coherent optical receiver may operate on differentially encoded phase-shift keying, and the interferometric demodulator may be a fixed interferometric demodulator. The non-coherent optical receiver may further include a substantially matched filter and a high gain preamplifier and, or alternatively, the receiver may include a polarization filtering element. In some embodiments, the non-coherent optical receiver may be configured to learn error rate from a header or forward error correction data independent of the transmitter and may be further configured to use the error rate internally or to notify a transmitter sending the expected incoming waveform of the error rate. The receiver may also be pilot tone stabilized. Other example embodiments described above in reference to the system can be combined with the non-coherent optical receiver.

An example embodiment of the coherent optical receiver may include a coherent demodulator configured, or operable to be configured, to operate at a data rate below a symbol rate of a received optical signal, where the data rate is a function of a burst-on duty cycle of the received optical signal.

The coherent optical receiver may be configured to receive an optical signal that includes a periodic header. The coherent demodulator may include a local oscillator laser having a linewidth greater than or equal to 0.1% of the data rate. In addition to various embodiments described above for an optical receiver in reference to the system embodiments, the coherent optical receiver may also include a high gain optical amplifier configured to operate in saturation and a filter substantially matched to the incoming waveform. The high gain optical amplifier may be configured to operate in a selectable gain mode. Various alternative embodiments as described above or elsewhere herein may form various combinations of the coherent optical receiver.

It should be understood that with respect to the transmitter and receiver embodiments, methods corresponding to the herein-described apparatuses may also be employed in various embodiments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7A is a diagram of data framing and synchronization structure employing an embodiment of the present invention;

FIG. 7B is yet another diagram of data framing and organization employing an embodiment of the present invention;

DETAILED DESCRIPTION OF THE INVENTION

Figure 1A:
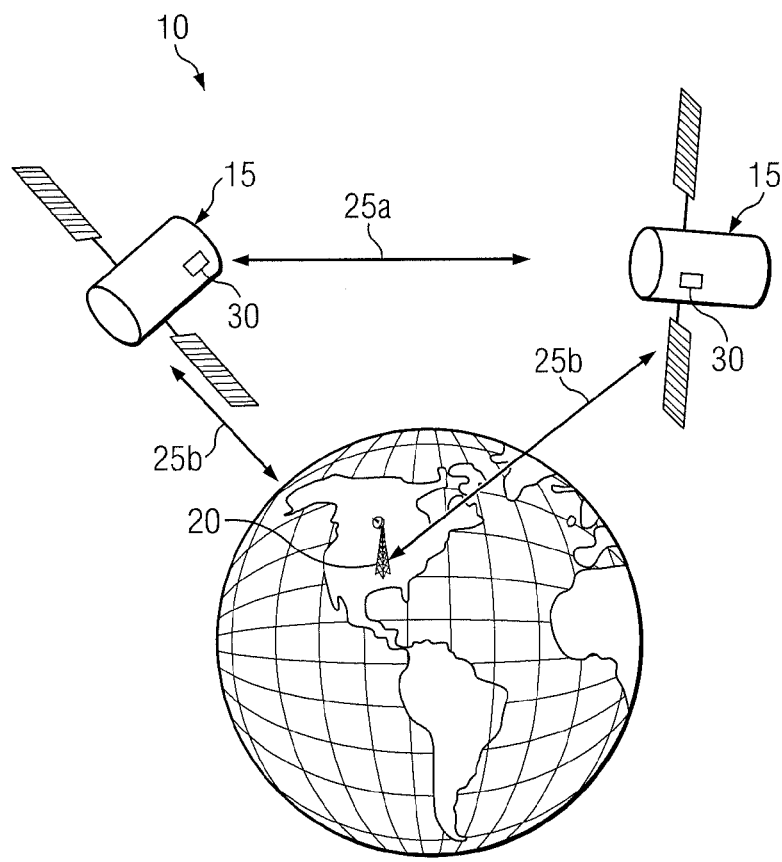
FIG. 1A is a perspective view of an optical inter-satellite communications system employing an embodiment of the present invention.

A description of example embodiments of the invention follows.

Embodiments of the present invention enable differentially encoded phase-shift keyed (DPSK) optical communications over a wide range of data rates with nearly optimal performance. In contrast with conventional DPSK designs, embodiments of the present invention may operate with good performance at high rates as well as low data rates (e.g., rates <~100 Mbit/s), overcoming at least three notable limitations: availability of low-cost, long-delay, delay-line interferometers (DIs), substantially-matched narrow-band optical filters, and narrow-linewidth (LW) laser sources.

Embodiments of the present invention combine the benefits of variable-duty cycle modulation techniques with packet-based burst-mode communications and DPSK modulation to achieve nearly optimal DPSK performance at rates below 1 Mbit/s, providing some, ~two-orders-of-magnitude, improvement in the range of DPSK rates achieved using conventional techniques. Furthermore, by varying the burst duty cycle, multi-rate DPSK may be implemented with a single transmitter (TX) and receiver (RX) design that may operate with nearly optimal performance over a range of rates exceeding four-orders-of-magnitude, from less than 1 Mbit/s to more than 10 Gbit/s in at least one embodiment.

Benefits of embodiments of the present invention may also be applied to coherent PSK and quadrature amplitude modulation (QAM) in terms of relaxing linewidth requirements of both transmitter laser and receiver local oscillator (LO) laser, enabling greater range, flexibility, and selection of communication rates. In addition, embodiments may be applied to and/or leverage other optical communications, such as those described in "Multi-Channel DPSK Receiver," U.S. Pat. No. 7,233,430; "Multi-Channel Differentially Encoded PSK Receivers," U.S. Pat. No. 7,411,726; "Filter-based DPSK Receiver," Int'l Application No. PCT/US2008/003844; "Reconfigurable Polarization Independent Interferometers and Methods of Stabilization," U.S. Pat. No. 7,414,728; Variable-rate Communication System with Optimal Filtering," U.S. Pat. No. 6,694,104; and "Methods of Achieving Optimal Communications," U.S. Pat. No. 7,181,097. The entire teachings of each of the foregoing references are incorporated herein by reference.

Applications of embodiments of the present invention include guided-wave optical communications (e.g., single-mode fiber and multi-mode fiber), and unguided optical communication including free-space (through atmospheric channel and space-based applications) and undersea.

Conventional PSK communications requires that the linewidth of the transmitter laser and receiver LO laser be a small fraction (<~0.1% depending on the receiver) of the data rate. Since typical (low-cost) distributed feedback (DFB) lasers commonly used for communications have ~1 MHz linewidths, this requirement, in practice, limits cost-effective PSK communications to high rates >~100 Mbit/s. In order to operate at lower rates, conventional PSK systems require costly or exotic narrow-linewidth lasers (e.g., with LW<~100 kHz), sources with little heritage and uncertain reliability. Optical DPSK communications is further limited by the DI, which is not commercially available with long time delay T>~400 psec that may support conventional DPSK at low rates >2.5 Gbit/s.

From U.S. Pat. Nos. 6,694,104, 6,831,779, and 7,414,728, the entire teachings of which are incorporated herein by references, it is known that optical DPSK communications with nearly optimal performance may be achieved at rates that are integer multiples the lowest rate, e.g., R(n)=n/T, where n is a positive integer and T is the DI time delay. Combining this capability with packet-based burst-mode communications, the rate may also be reduced by a fractional factor of h, (0<h<=1), so that a single TX and RX design may operate over a vastly extended range or rates R(h,n)=hn/T. It should be noted that this burst-mode approach is commonly used for time-division multiple access (TDMA) communications in which many users share a common communications channel. A unique feature of embodiments of the present invention is the application of both variable duty-cycle and burst-mode TDMA techniques to a single PSK transmitter and receiver, which enables significant improvements to the realizable range, selection, and flexibility of rates without sacrificing performance (receiver sensitivity and transmitter power efficiency).

Embodiments of the invention have been reduced to practice, demonstrating near theoretical burst-mode DPSK using a commercially available DFB laser and 400 psec, 2.5 GHz DI, performing seamlessly in conjunction with optional forward error correction coding at rates from 0.9 Mbit/s to 2500 Mbit/s. At the lowest rate of 900 kbit/s, the linewidth of the DFB laser is comparable to the data rate, a condition that would incur significant penalties using prior approaches known in the art. Furthermore, using conventional DPSK demodulation techniques would require a 900 kHz delay-line interferometer (DI) with corresponding time delay of 1.11 microsecond. Such a long time delay is equivalent to approximately 333 m in free space and 222 m in optical fiber, precluding small form-factor implementations, making it difficult to stabilize and requiring extremely challenging sub-100 kHz signal wavelength to DI alignment in order to avoid substantial performance penalties.

FIG. 1A is a perspective view of an optical inter-satellite communications system 10 employing an embodiment of the present invention. The optical inter-satellite communications system 10 includes at least two satellites 15 in communication with each other via an intersatellite optical communications link 25a and with a ground station 20 via a space-to-ground (and vice versa) optical communications links 25b. The satellites may employ optical communications to send and receive data that may be relayed to another satellite or utilized by the satellite. The data may include pointing, acquisition and tracking (PAT) information, positioning information, attitude information, diagnostic static checks, or other functions, or data to be retransmitted. Each of the satellites 15 includes an optical transceiver 30. The optical communications link 25a between the satellites 15 may change due to varying link distances or degradation of elements within the optical transceivers 30.

Figure 1B:
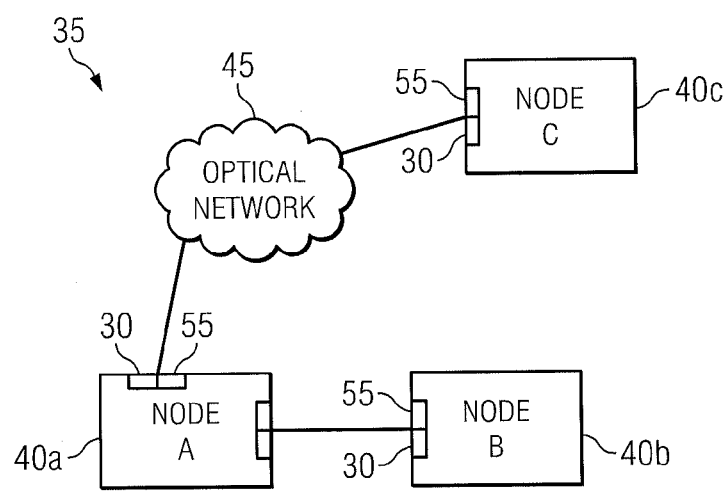
FIG. 1B is a network diagram of a ground-based optical communications system employing an embodiment of the present invention.

FIG. 1B is a network diagram of a ground-based optical communications system 35 employing an embodiment of the present invention. The optical communications system 35 includes optical network nodes 40a, 40b, and 40c, and includes an optical network 45, across which optical signals are transmitted between nodes A and C. The optical network 45 may incorporate electrical network elements and interfaces that facilitate connectivity with other elements connected to the optical network. Each of the network nodes 40a-c may include an optical transceiver 30 with network interface 55 according to an embodiment of the present invention.

In one embodiment, the optical interferometers of FIGS. 1A and 1B demodulate Differential Phase Shift Keying (DPSK) communications signals. Such signals may be used for Synchronous Optical Network (SONET) communications protocol signals.

Figure 1C:
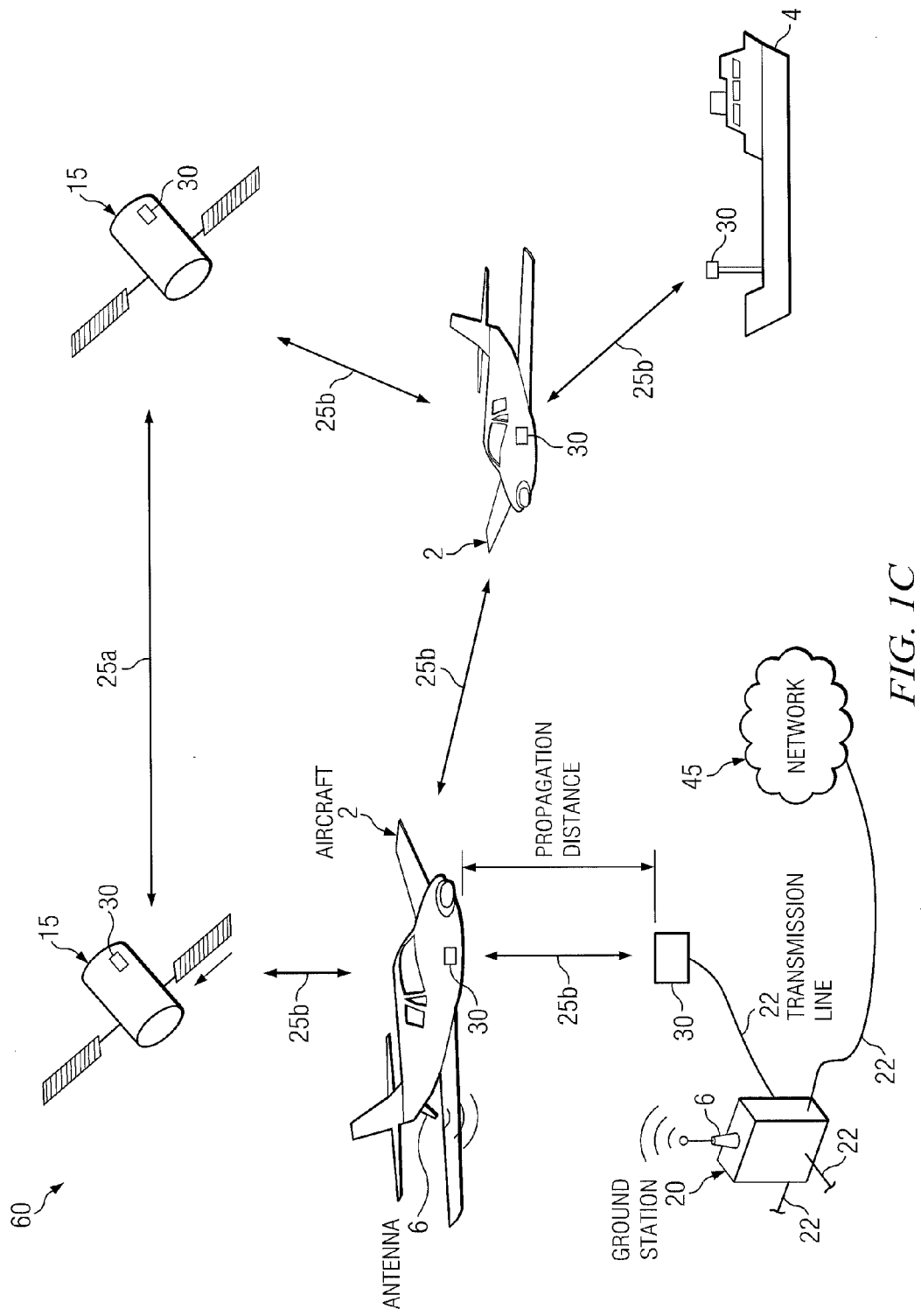
FIG. 1C is a network diagram of an extended optical communications system employing an embodiment of the present invention and including elements of the optical inter-satellite communications system of FIG. 1A and the ground-based optical communications system of FIG. 1B.

FIG. 1C is a diagram of an extended optical communication system 60 optionally incorporating elements of an optical inter-satellite communications system 10, a ground-based optical communications system 35, aircraft-based 2 and ship-based 4 optical communications 25b, and corresponding optical communication links 25a, 25b inter-connecting the various elements and the optical network 45. The optical communication links that travel through the atmosphere or atmospheric link 25b may experience dynamic transmission characteristics including scintillation and fading. Moreover, the ship-and aircraft-based link distances are likely to change, impacting the overall channel loss and communications link budget. Each of the elements within the extended system may include or be connected to an optical transceiver 30 according to an embodiment of the present invention.

Figure 2A:
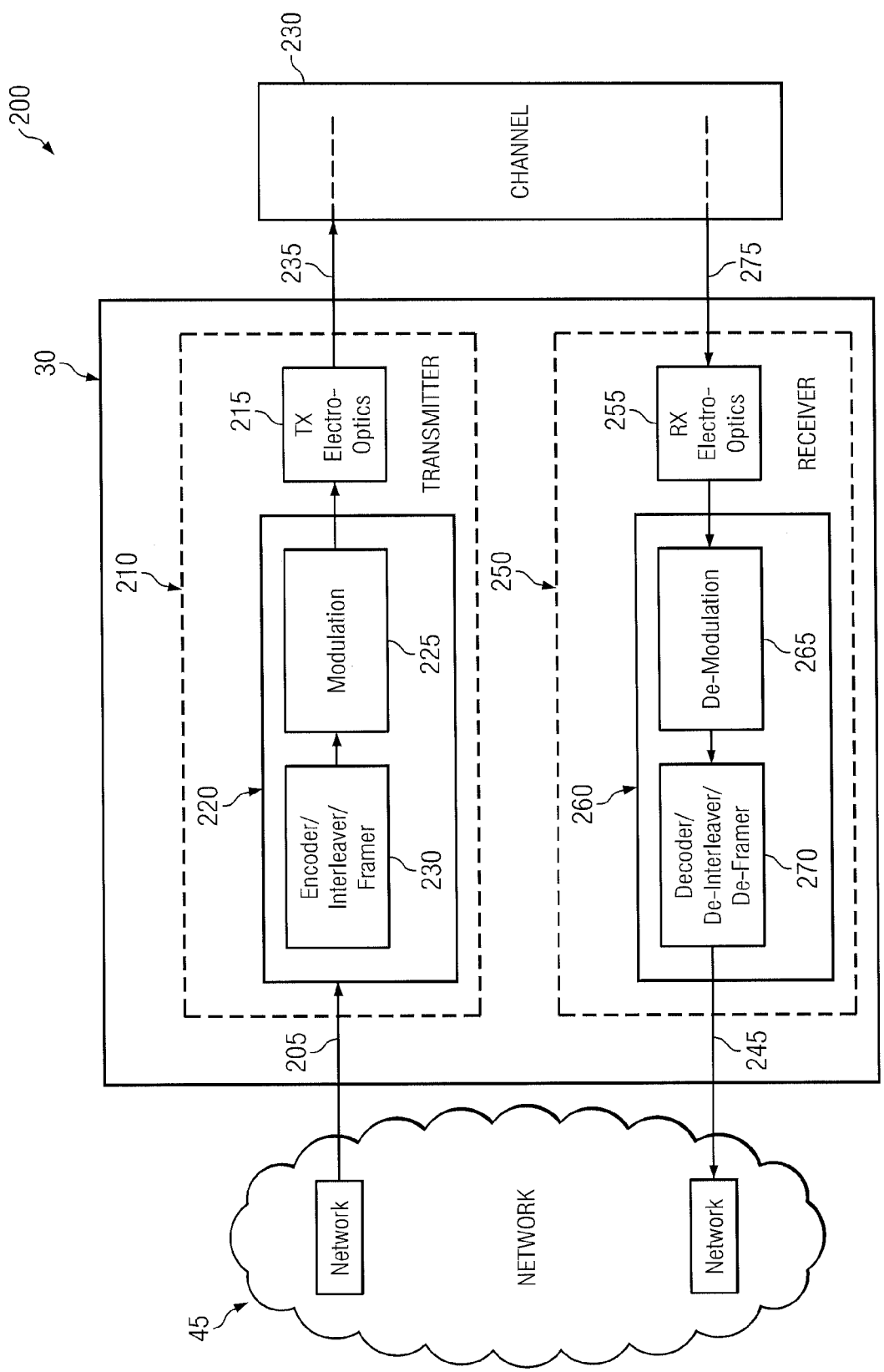
FIG. 2A is a diagram of an optical communication transceiver employing an embodiment of the present invention.

FIG. 2A is a detailed block diagram 200 including an optical transceiver 30 according to an embodiment of the present invention, data connections between optical network elements 45, and optical communications through an optical channel 230 through which the optical transceiver 30 communicates with other optical transceivers 30. The optical transceiver 30 includes a transmitter 210 and a receiver 250 which are locally resident. The optical channel 230, may accommodate guided wave or free-space transmission of single or multiple spatial modes; may include impairments such as chromatic dispersion, modal dispersion, polarization mode dispersion, optical nonlinearities, e.g., four wave mixing (FWM), self phase modulation (SPM), and nonlinear phase distortion, background optical noise, amplified spontaneous emission (ASE) noise, modal noise, inter-channel-interference (ICI), intra-channel interference, intersymbol interference; and may include static or dynamic attenuation, such as fading and scintillation induced by the free-space channel or multimode optical fibers.

The transmitter 210 receives input data 205 from the network 45, and performs data formatting 220, which may include encoding, interleaving, framing 230 and modulation encoding 225 of the input data. Transmitter electro-optics 215 together with input from the formatter 220 impart the formatted data onto an optical carrier and transmit optical communications signals 235 through the optical channel 230 to a remote optical receiver (not shown), which may be part of another optical transceiver 30. The transmitted optical communication signals 235 may be PSK, QAM, DPSK, Orthogonal Frequency-Division Multiplexing (OFDM), or other modulated signals such as on-off-keying (OOK), polarization modulation (PoLSK), pulse position modulation (PPM), frequency shift keying (FSK), and M-ary or hybrid variants of these formats. The transmitted optical communication signals may include wavelength division multiplexed (WDM) or polarization division multiplexed (PDM) signals. The data rate of the optical signals 235 may be varied according to an embodiment of the present invention.

The receiver 250 receives optical communication signals 275 from a remote optical communication transmitter 215 which may be part of another transceiver 30. The received optical communication signals 275 may be M-PSK, M-QAM, M-DPSK, OFDM or other modulated signals, including OOK, M-PoLSK, M-PPM, M-FSK, or hybrid variants of these formats. The received optical signals may include WDM or PDM signals. The data rate of the optical signals 275 may be varied according to an embodiment of the present invention. The receiver electro-optics 255 and demodulation elements 265 in the deformatter 260 process the incoming optical communication signals 275 and generate demodulated data. The demodulation process may include coherent or interferometric demodulation. The demodulated output is then processed by the next deformatter element 270, which may include decoding, de-interleaving, and deframing components performing respective functions. The deformatted output data 245 may then be relayed to the network 45.

Figure 2B:
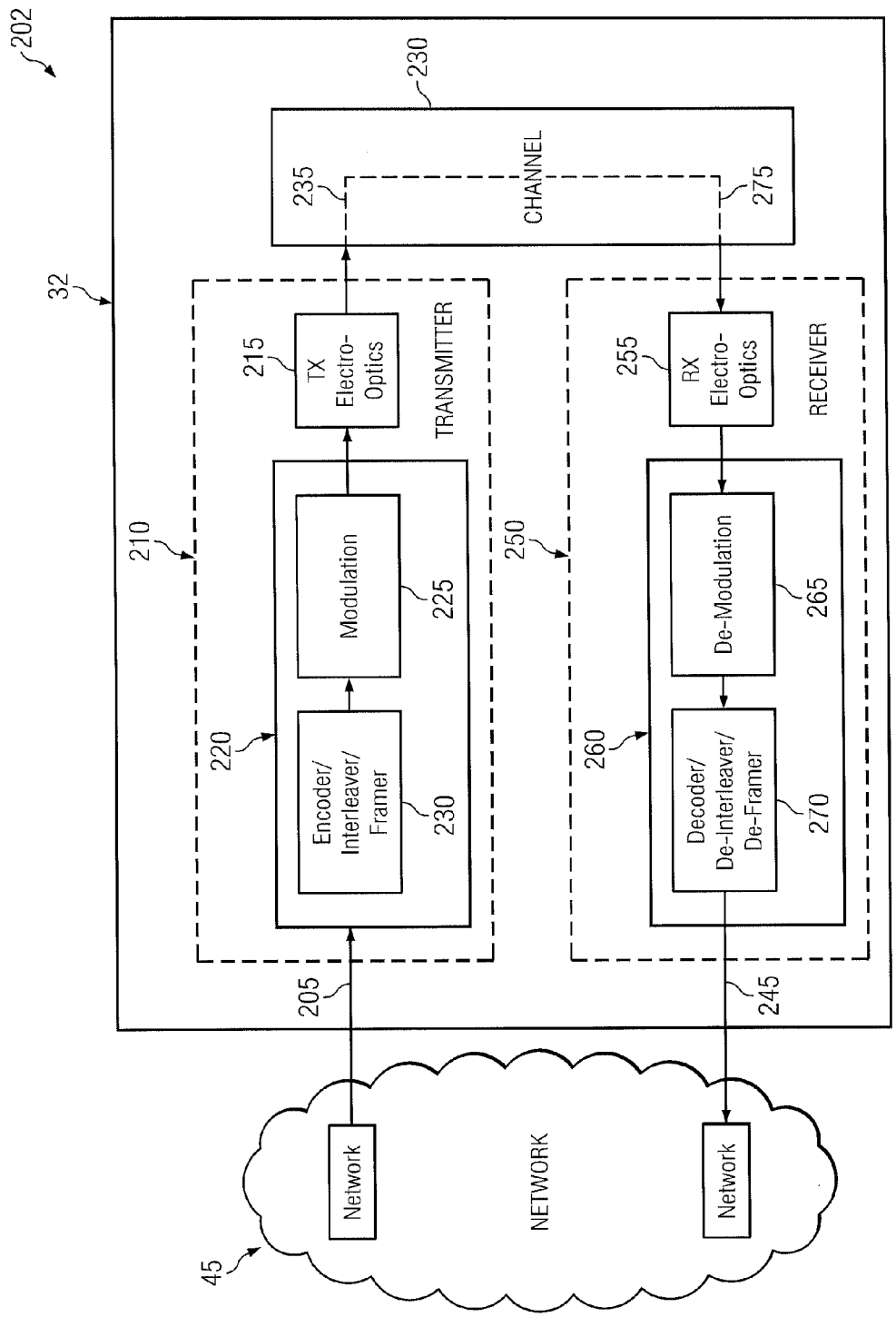
FIG. 2B is a diagram of a an optical communication transmitter/receiver pair employing an embodiment of the present invention.

FIG. 2B is a detailed block diagram 202 including an optical transmitter/receiver pair 32 according to an embodiment of the present invention, data connections between optical network elements 45, and optical communications through an optical channel 230, through which the optical transmitter communicates with an optical receiver 250. It should be understood that the optical transmitter 210 of FIG. 2A and optical receiver 250 in the same optical transceiver 30 or different optical transceivers may also be referred to herein as optical transmitter/receiver pair(s). What is relevant is not optical transmitter and receiver proximity to be considered a pair, but rather their abilities to communicate with each other in a manner as presented herein.

The transmitter 210 receives input data 205 from the network 45 and performs data formatting 220. Transmitter electro-optics 215, together with input from the formatter 220, impart the formatted data onto the optical carrier and transmit optical communications signals 235 through the optical channel 230 to a remote optical receiver. The transmitted optical communications signals 235 may be M-PSK, M-QAM, M-DPSK, OFDM, or other modulated signals OOK, M-PoLSK, M-PPM, M-FSK, or hybrid variants of these formats. The transmitted optical communication signals may include WDM or PDM signals. The data rate of the optical signals 235 may be varied according to an embodiment of the present invention.

The receiver 250 receives optical communication signals 275 from a remote optical communications transmitter 215. The received optical communications signals 275 may be M-PSK, M-QAM, M-DPSK, OFDM, or other modulated signals including OOK, M-PoLSK, M-PPM, M-FSK, or hybrid variants of these formats. The received optical signals may include WDM or PDM signals. The data rate of the received optical signals 275 may be varied according to an embodiment of the present invention. The receiver electro-optics 255 and demodulation elements 265 in the deformatter 260 process the incoming optical communication signals 275 and generate demodulated data. The demodulation process may include coherent or interferometric demodulation. The demodulated output is then processed by the next deformatter element 270, which may include decoding, de-interleaving, and deframing functions. The deformatted output data 245 may then be relayed to the network 45.

Figure 3:
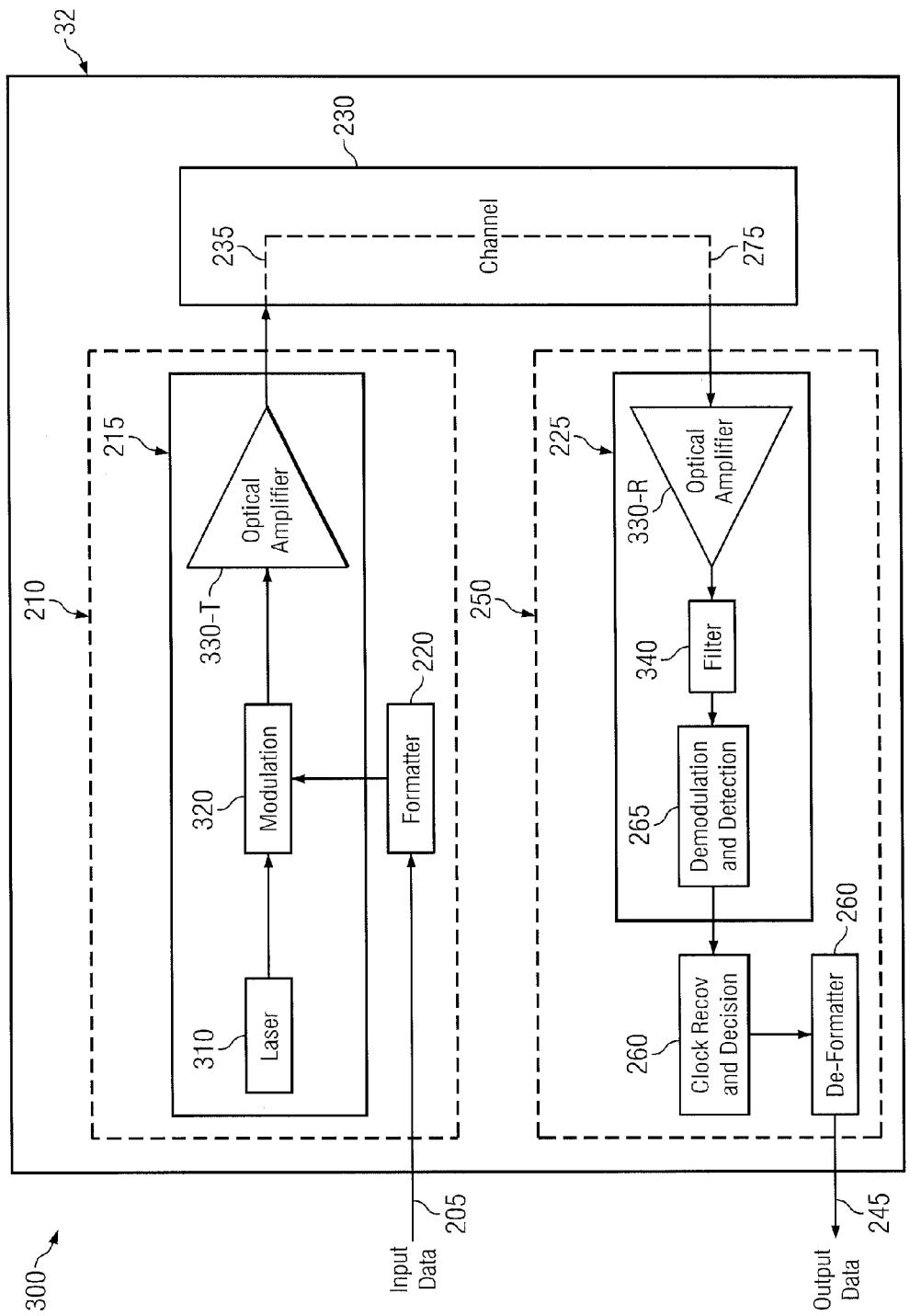
FIG. 3 is yet another diagram of an optical communication transmitter receiver pair employing an embodiment of the present invention.

FIG. 3 is a detailed diagram 300 including an optical communications transmitter/receiver pair 32 according to an embodiment of the present invention, with input data 205, an optical transmitter 210, an optical channel 230 through which the optical communication signals travel, an optical receiver 250, and output data 245. The transmitter 210 receives input data 205 and performs data formatting 220. In one embodiment, the transmitter uses a master oscillator power amplifier (MOPA) configuration. The MOPA may include a laser source 310, a means of imparting the modulation 320 on an optical carrier or plurality of optical carriers, and a power amplifier 330T. The laser source or plurality of laser sources may be a distributed feedback (DFB) laser, a widely tunable distributed Bragg reflector (DBR) laser, a fiber laser, external cavity laser, WDM laser source or other laser source. Methods of imparting the modulation to generate the transmitted optical 235 signals include direct modulation of the laser source (or plurality of laser sources) or external modulation of optical phase, frequency polarization, amplitude, or polarization to generate. The modulation may use non-return-to-zero (NRZ) or return-to-zero (RZ) pulse-shaped waveforms. In an example embodiment, the RZ waveforms have a Guassian pulse shape. The modulated optical signals may subsequently be amplified with an optical amplifier 330-T, which may be a rare-Earth doped optical amplifier such as an EDFA (Erbium doped fiber amplifier) for operation at 1.55 μm or a YDFA (ytterbium doped fiber amplifier) for operation at 1.0 μm. EDFA's and YDFA's with average output powers exceeding 20 W are commercially available today. In another example embodiment, the optical amplifier 330-T may be saturated and average power limited such that the peak power varies inversely with the duty cycle of the modulated optical input signals. The optical amplifier 330-T may also be a semiconductor-based optical amplifier. The amplifier may also include a nonlinear element used to perform wavelength conversion of the modulated input signal. The transmitter output 235 may be in a single or dual polarization state, and may transmit any of the modulations or signaling methods described in the optical transceiver 200 and optical communication transmitter /receiver pair 202.

The transmitter optical waveforms propagate through the channel 230 to the receiver 250. In an example embodiment, the signal is first received by a low-noise optical amplifier 330-R, which may share most of the characteristics of the transmitter power amplifier 330-T, but with lower noise figure and lower output power. In another example embodiment, the optical amplifier 330-R may be a high-gain EDFA with a nearly ideal noise figure of 3 dB. The output of the optical amplifier may be optically filtered 340 to reduce out-of-signal-band optical noise such as ASE, ICI, or solar background for signals propagating through the free-space channel. The filter may have a single pass band or periodic pass bands followed by a passband selecting element, such as an arrayed waveguide grating router (AWGR) which may perform filtering and WDM functions. Demodulation 265 may be interferometric or coherent using conventional optical-phase-locked loop (OPLL) techniques or subsequent digital signal processing (DSP) based demodulation. The receiver may include clock recovery and decision circuitry 260 or a plurality of clock recovery and decision circuits to accommodate the reception of multiple WDM modulated signals. The deformatter 260 inverts the operation of the formatter 220, and may include decoding, de-interleaving, and de-framing functions.

Figure 4A:
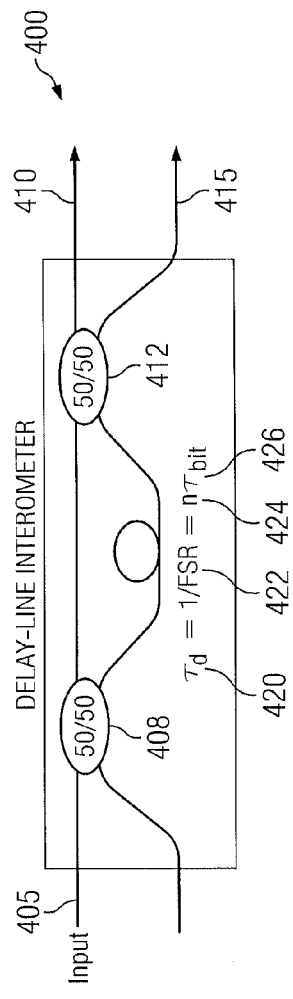
FIG. 4A is a diagram of a prior art delay-line interferometer (DI)

FIG. 4A shows a delay-line interferometer (DI) 400 which is commonly used for interferometric demodulation of differentially encoded phase shift keyed (DPSK) waveforms. An incident phase-modulated optical signal 405 is split into two paths at a first 50/50 coupler 408 and then recombined with relative time delay $\tau_d$ 420 at a second 50/50 coupler 412. DI outputs 410 and 415 have a periodic cosine squared 485 and sine squared 490 transfer functions 480 shown in FIG. 4C. The periodicity of the DI transfer function is known as the free spectral range (FSR) 422 equal to the reciprocal of the relative time delay 420.

While a single DI is commonly used to demodulate binary DPSK or 2-DPSK waveforms, other demodulation approaches exist, including filter-based demodulation (e.g., using properly phased arrayed waveguide grating routers) and coherent local oscillator-based demodulation. It is well known in the art that properly phased DIs may be used to demodulate higher order DPSK modulated waveforms, such as 4-DPSK, also commonly referred to as DQPSK and higher orders more generally referred to as M-DPSK, where M is an integer greater than 1, but commonly an even power of 2 (e.g., 4, 8, 16).

It is known in the art that for good demodulation of M-DPSK waveforms, the demodulating DIs must have a time delay 420 approximately equal the integer number n 424 of the bit duration 426 (e.g, $\tau_d = n*\tau_{bit}$). Most commonly, n=1 (so that the outputs 410 and 415 are dependent on the interference of two adjacent bits), and the time-delay 420 and bit duration 426 are approximately equal (e.g., for n=1, $\tau_d = \tau_{bit}$). In this case, corresponding data rate R, which is equal to the reciprocal of the bit duration 426, is also equal to the FSR 422 (e.g., for n=1, $R=1/\tau_{bit}=FSR$). When the integer n is greater than one, the demodulated output corresponds to the interference of non-adjacent bits separated by n bits. This demodulation configurations is referred to as non-adjacent DPSK or NA-DPSK, shown in FIG. 5. In this case, the rates that the DI may demodulate are integer multiples of the FSR, i.e., R=n*FSR.

Figure 4B:
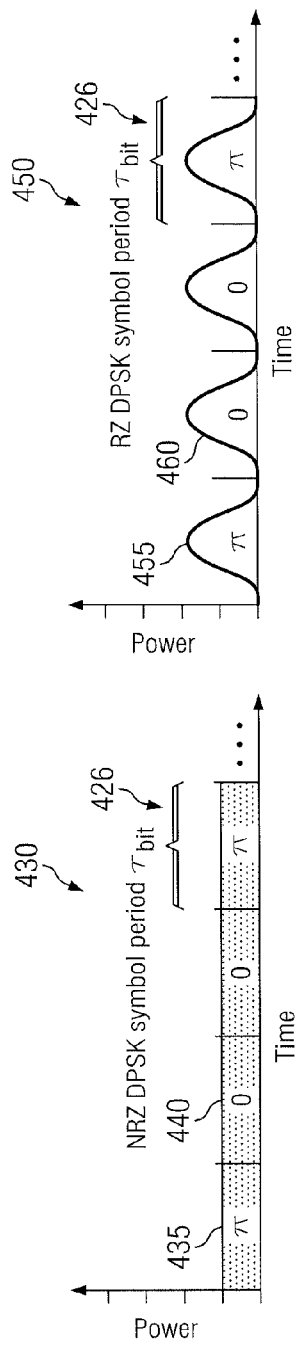
FIG. 4B is a diagram of prior art non-return-to-zero (NRZ) binary differentially encoded phase shift keying (2-DPSK) waveforms 430 and return-to-zero (RZ) 2-DPSK waveforms 450.

FIG. 4B shows non-return-to-zero (NRZ) binary differentially encoded phase shift keying (2-DPSK) waveforms 430 with two relative phases of pi 435 and 0 440 and peak power equal to 1 unit and bit duration 426.

Return-to-zero (RZ) 2-DPSK waveforms 450 have the same relative phases 455 and 460 and bit duration 426 as the NRZ waveforms 430, but approximately twice the peak power (2 units). There are many ways to generate pulsed RZ waveforms known in the art, including commonly used pulse carving techniques, which may generate a variety of Gaussian-like waveforms.

Note that with conventional DPSK interferometric demodulation described in the art, as the data rate R is lowered, the corresponding bit duration 426 increases. This causes the minimum DI time delay 420 increase and the corresponding FSR to decrease. It is well known that long-delay DIs are harder to manufacture and more difficult to stabilize due to factors such as the size, insertion loss, and acoustic pickup of long delay elements. Commercial off the shelf (COTS) DIs with FSRs less than 2 GHz (or time delays >500 psec) are not available, and, therefore, interferometric (DI-based) demodulation of DPSK waveforms with less than 2 GHz symbol rates requires custom solutions.

Figure 4C:
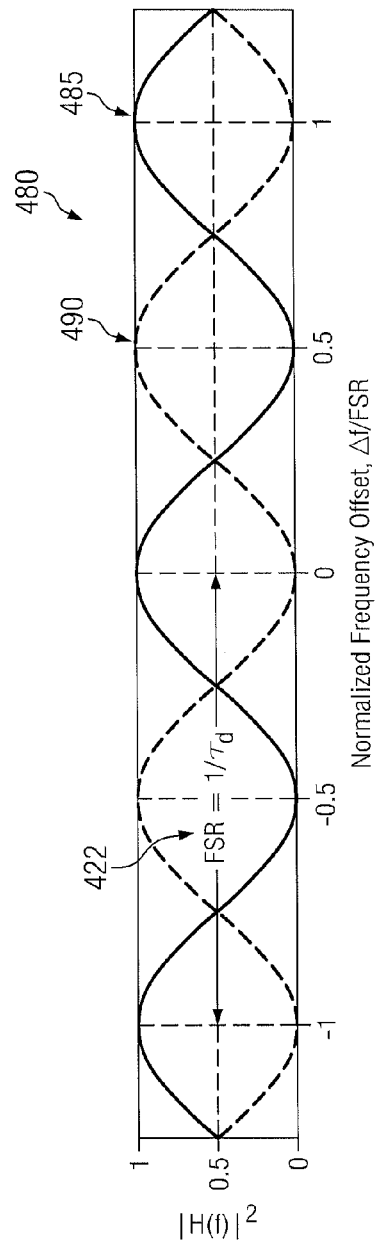
FIG. 4C is a diagram of prior art transfer function of a delay-line interferometer.

FIG. 4C shows the frequency domain transfer function 480 of a DI 400 with orthogonal outputs 410 and 415 generating cosine squared 485 and sine squared 490 periodic outputs, with periodicity 422 known as the free spectral range or FSR. DIs typically have a very wide spectral range of operation that may be tens of THz wide. Due to the periodicity and wide bandwidth, when combined with appropriate wavelength division demultiplexing (WDM) elements, a single DI may be used to demodulate many wavelength multiplexed signals.

Figure 5:
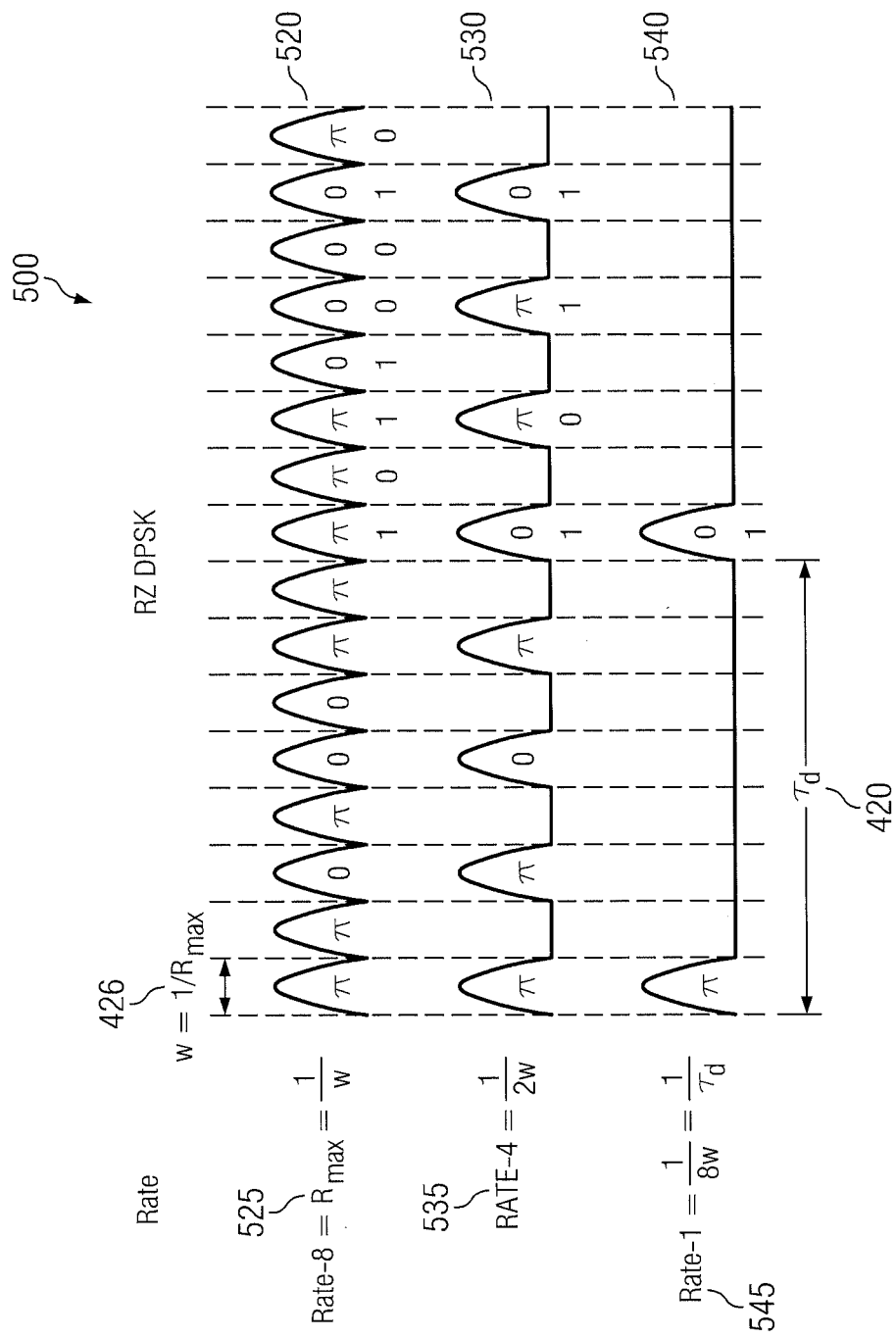
FIG. 5 is a diagram of prior art non-adjacent RZ DPSK waveforms.

FIG. 5 shows multi-rate DPSK using non-adjacent (NA) DPSK waveforms 500, in which a single interferometric demodulator (and optical filters) may be used to demodulate fixed-shaped pulses of width w 426 at rates that are integer multiples of the interferometric demodulator free spectral range (FSR) and a maximum rate 525 $R_{max}=1/w$ determined by the pulsewidth w 426.

NA-DPSK demodulation is often implemented using delay-line interferometers (DIs), although filter-based demodulators may also be used. Conventional DPSK receivers use a DI with FSR=R, where R is the data rate. For NA-DPSK received with interferometric demodulation, the lowest rate is R=FSR, and the rate grows with n.

For non-adjacent DPSK communications, DIs with delay 420 $\tau_d$ or FSR=$1/\tau_d$ may demodulate data rates R(n)=$n/\tau_d$=nFSR, where n is a positive integer using pulses of width 426 w=$\tau_d/n$. The highest rate $R_{max}$ 525 is Rate-n, or Rate-8 in 500, indicating that the data rate is n-8-times faster (for n=8) than that supported using standard DPSK demodulation. $R_{max}=1/w$ for maximum n, which is 8 in this example, with no empty slots within the pulse stream 520.

The lowest rate 545 referred to as Rate-1 is for n=1, or R(1)=$1/\tau_d$=FSR, with periodic low-duty-cycle waveforms 540 comprised of one pulse of width w followed by n−1 empty slots of width w.

Intermediate rates, e.g., Rate-4 535 with every other slot empty, are illustrated in waveform 530.

Low DPSK performance penalty requires:
transmitter linewidth<FSR/1000=1/(1000T)= 1/(1000nw)=R/(1000n); and
DI-to-Signal WL misalignment,
$\Delta f$<FSR/10=1/(10$\tau_d$)=1/(10nw)=R/(10n)

Thus, for non-adjacent multi-rate DPSK, TX linewidth and signal-to-DI misalignment requirements are n-times more stringent for the lowest rate than for conventional DPSK, in which the FSR=R. In this example 500, the requirements are 8-times more stringent.

Figure 6:
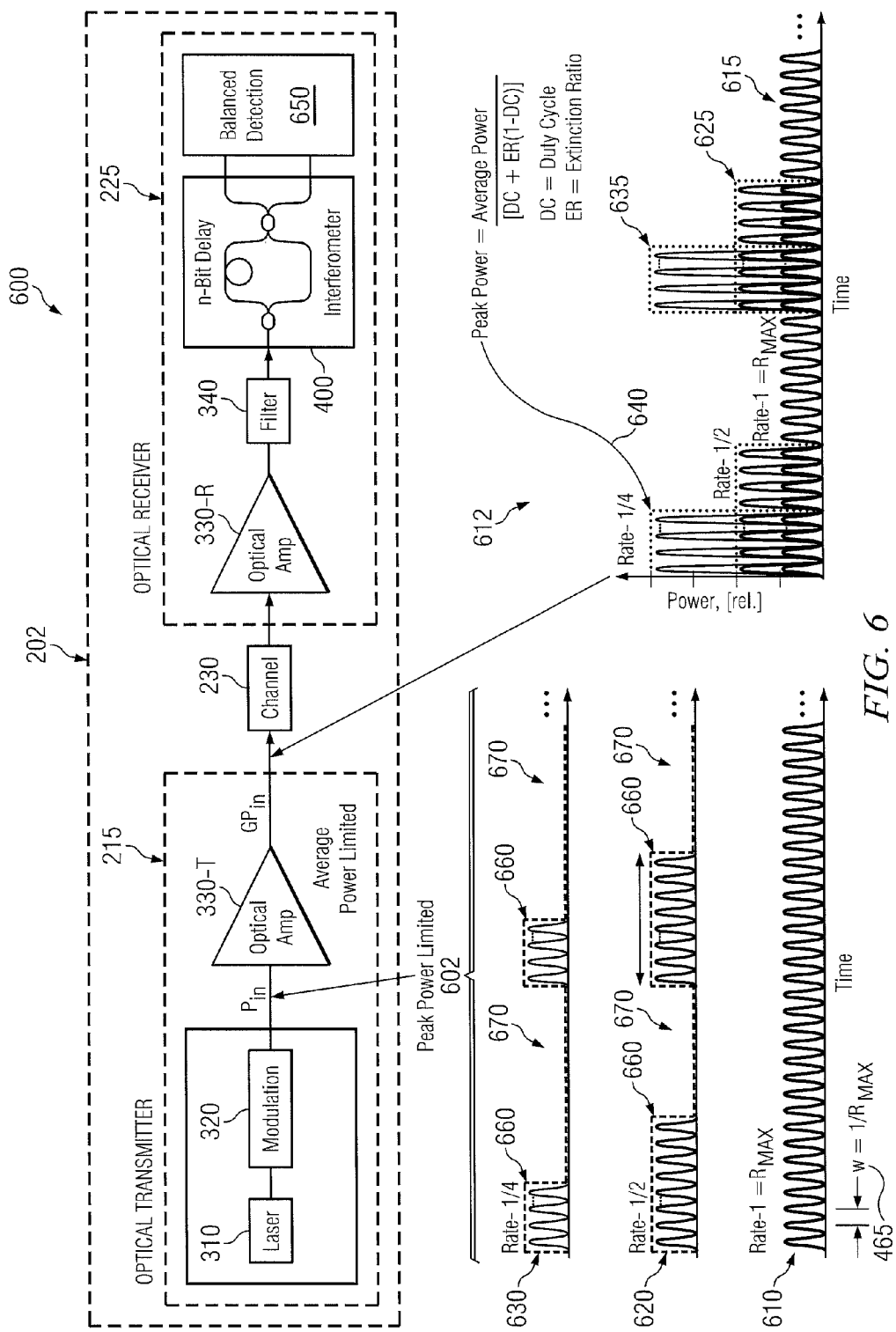
FIG. 6 is a diagram of a an optical communication transmitter/receiver pair with peak power limited waveforms (PPL) and average power limited (APL) waveforms employing an embodiment of the present invention.

FIG. 6 shows an optical transmitter and receiver pair 202 communicating with multi-rate burst-mode waveforms 602 and 612 in an example embodiment of the present invention.

The optical transmitter 215 is a Master Oscillator Power Amplifier (MOPA) configuration, including a laser 310, modulation 320, and power amplifier 330-T. The transmitter 215 transmits optical signals through the channel 230. These signals are received by the optical receiver 225, which is configured as an optically preamplified DPSK receiver with optical filter 340, DI 400, and balanced detection 650.

The MOPA transmitter may be flexible and scalable, being compatible with both time division multiplexed (TDM) and wavelength division multiplexed (WDM) communications at Mbps rates to hundreds of Gbps and beyond. The MOPA design may be modular, allowing for a more flexible choice of waveforms and independent design and optimization of the laser, modulator, and power amplifier. The design commonly used for high rate optical communications in the telecom communications industry and is well suited for free-space lasercom platforms operating from Mbps to many Gbps rates.

In an example embodiment, the power amplifier 330-T may be an EDFA or a YDFA. The laser 310 and modulation 320 combination generates the waveforms 602. Modulation may be imparted by one or more modulators (e.g, carver, data, and burst-window modulators) or may be generated through direct laser modulation.

A useful feature of the optical amplifier that makes it especially well suited for free-space communications, is that it may be average power limited (APL) when running in saturation, and, therefore, the peak output power varies inversely with the duty cycle of the input.

In contrast to conventional multi-rate designs, and typically the case for radio-frequency (RF) communications where the constant duty cycle constant and the pulse width is varied, a constant pulse width may be used with an APL TX without loss of efficiency, and the duty cycle (DC) may be varied to lower the rate, e.g., Rate(DC)=DC*R, where 0<DC<=1, R=1/w, and w is the (binary) symbol duration. Consequently, a single receiver matched to the highest data rate determined by the pulse width may be used for all rates without incurring a receiver penalty. Furthermore, there is no transmit power penalty due to the average power limited (APL) properties of the transmitter.

Arranging the transmitted symbols (pulses) in bursts (sequential series of symbols) is a preferred embodiment of this invention and provides additional benefits to differentially encoded phase shift keyed (DPSK) communications, since a single delay-line interferometer (DI) matched to the highest data rate (e.g., FSR=R) may be used for all rates <=FSR, e.g., Rate(DC)=DC*FSR, without incurring a receiver penalty. Moreover, this approach enables low-rate DPSK reception without incurring conventional linewidth/rate or signal-to-DI wavelength misalignment penalties.

For small performance penalty conventional DPSK performance requires:
transmitter linewidth<FSR/1000=R/1000
DI-to-Signal WL misalignment, $\Delta f$<FSR/10=R/10

However, for small performance penalty with multi-rate burst-mode DPSK, performance requires:
transmitter linewidth <FSR/1000=RI(DC*1000)
DI-to-Signal WL misalignment, df<FSR/10=R/(DC*1000).

Thus, for a range of rates spanning three-orders of magnitude (factor of 1000, e.g., DC=0.001) using an embodiment of multi-rate burst-mode DPSK according to an embodiment of the present invention, the linewidth and alignment requirements are relaxed for the lowest rate by a factor of 1000.

In sharp contrast, for prior-art multi-rate non-adjacent DPSK described in FIG. 5, the linewidth and alignment requirements are worsened by a factor of 1000.

Comparing these restrictions for prior-art NA-DPSK at the lowest rate to the burst-mode multi-rate embodiment of the invention described above, for a range of rates spanning a factor of n, the linewidth and alignment requirements for the multi-rate burst-mode DPSK approach are $n^2$ times better than that of the non-adjacent multi-rate DPSK approach. For a range of data rates of a factor of 1000 (30 dB), an embodiment of the present invention would have a factor of one million times (60 dB) benefit over the equivalent NA-DPSK approach described in the prior art.

Another advantage the present invention has over multi-rate NA-DPSK is that the multiple data rates may be selected from any rate lower than the maximum determined by the DI FSR and the burst-on duty cycle, which is a ratio of two integer numbers. In contrast, NA-DPSK may only be selected from an integer multiple of the FSR, so that the range of rates selected is much more granular.

Yet another advantage embodiments of the present invention have over multi-rate NA-DPSK is a more simplified clock recovery, which simply locks to the same symbol clock at all rates. In contrast, there are multiple clocks needed for multi-rate NA-DPSK waveforms, though they are harmonics of each other.

This advantage also distinguishes embodiments of this invention from packet-switched multi-access communications systems known in the art, which use packetized burst-mode to communicate data from multiple transmitters to one or more receivers. For such systems, the symbol clocks and burst arrival times are generally asynchronous, meaning that the multi-access receiver needs to quickly detect the burst of data and recover the data symbol clock for each burst arrival. This places an added burden on the receiver clock recovery to be fast, and requires a preamble at the beginning of each packet with which the clock recovery can synchronize. The single transmitter and receiver pair embodiment of this invention means that the symbol clock and burst data are synchronous, greatly simplifying the bursty nature of embodiments of this invention.

Note that these same linewidth benefits noted above also apply to other phase-sensitive receivers, such as coherent receivers that use a local oscillator in the receiver, meaning burst-mode PSK communications may reduce the linewidth requirements by a factor of the DC as long as the burst-on time is long enough to achieve phase locking.

For the case of feed-forward DSP-based coherent receivers, this may be achieve with little-or-no loss since once enough burst-on data has been received, the receiver may determine the relative LO-to-input signal phase (by accruing enough information in memory and then feeding forward).

For the case of feedback-based coherent receivers (e.g., using OPLLs), there is an additional penalty of data lost after the burst-on data starts but before the OPLL locks the phase. However, this additional penalty may be minimized by using long burst-on times and/or fast OPLLs (e.g., short phase-locking times).

It should be noted that relative to differentially encoded PSK receivers, which only require a single linewidth-sensitive laser in a TX/RX pair, the benefits of embodiments of the present invention may even be more helpful to local-oscillator-based coherent receivers, which may have two linewidth-sensitive lasers in a TX/RX pair (a transmitter laser and receiver-based local oscillator laser), in addition to having greater sensitivity to laser linewidth, especially for complex large-constellation M-PSK, M-QAM, and OFDM modulations. While current coherent-type optical communications systems target high data rates (e.g., 40+Gbps/wavelength channel) over relatively stable fiber-optic channels, the ability to operate these same high-speed systems at much lower data rates may provide wider applicability over less stable channels, such as free-space atmospheric, submarine, or space-based, and guided channels, such as multimode and/or non-linearly limited fiber channels, where channel conditions or link-distances and power-budgets may be dynamic and fall-back modes of operation and bandwidth-on-demand capability desirable.

Representative peak-power-limited 602 burst-mode input waveforms include Rate-1 waveform 610, Rate-½ waveform 620, and Rate-¼ waveform 630, which all have the same peak power, (e.g., a peak power limit) regardless of duty cycle. For rates less than Rate-1, the burst-on time 660 is accompanied by a burst-off time 670, which is indicated by empty data slots. For the full rate (Rate-1), the burst-off time is 0. For the corresponding average power limited output waveforms 612, with the Rate-1 waveform 615, Rate-½ waveform 625, and Rate-¼ waveform 635, the peak power varies inversely with the duty cycle following the expression 640, Peak power=average power/$[DC+ER(1-DC)]$, where DC is the burst-on duty cycle (for example, Rate-1, Rate-½, and Rate-¼ waveforms have duty cycles 1, ½, and ¼, respectively), and ER is the off-to-on power ratio (in linear units). From the peak power expression above, it may be seen that for perfect ER with infinite extinction, e.g., ER=0 (linear), the expression becomes:

Peak power=average power/$DC$.

For non-zero ERs, power from the APL transmitter during the burst-off times (empty slots) seeps out and is wasted. This ER-induced wasted is referred to as the TX-power-robbing penalty. To keep this penalty <0.2 dB, the ER should be 15 dB (−30 times) greater than the duty cycle, e.g., abs(ER)<abs(DC)+15 dB. When DC=ER, about ½ the power seeps out during the off time, and the Peak APL output power is about ½ what it would be for the ideal ER, corresponding to a 3 dB power penalty due to TX power robbing.

Note that the fundamental pulse shape and inter-pulse spacing (except for the burst edges) is the same at all rates; what changes between the input waveforms is the duty cycle, specifically the burst-on duty cycle.

As the DC gets lower, the output waveforms from an APL transmitter experience more gain. As can be seen, the amplitude of the low-duty-cycle output waveforms are larger, with the peak of the Rate-¼ APL waveforms 635 being 4-times larger than the Rate-1 APL waveforms 615, with both waveforms having the same average power. This is a good illustration of how energy-per-bit may be increased by varying the duty-cycle.

While using burst-mode data formatting to communicate at multiple rates provides many benefits, it does require that the receiver be able to synchronize with the bursts, so that the receiver may detect the data during the burst-on times. For periodic or predefined sequences of data bursts, this may be achieved via burst-clock recovery, which as noted earlier, is enabled by the periodic or predictable nature of received burst-mode transmissions between a single transmitter and receiver pair. Another optional approach for achieving this synchronization is to use header-based burst-mode synchronization. Still another embodiment employs other synchronization techniques, such as pilot tone synchronization.

FIG. 7A shows an example embodiment of this invention using header-based data framing and synchronization 700, which performs a primary function of telling the receiver where the data starts. The header may also assist with clock recovery, contain channel-state information or telemetry, channel-state information, error-rate estimates, and/or contain configuration information, e.g., burst-on-length, burst-off-length, burst-on duty cycle parameters. In free-space optical links, for example, the header may contain pointing, acquisition, or tracking (PAT) information (e.g., point-ahead errors), Doppler offsets, time-of-flight related estimates, and/or estimated wavelength information.

The periodic header 720 (optional) precedes the data 730 at the beginning of each frame 710. The data may be transmitted in one or more bursts within each frame.

In one example embodiment, the header may be taken from a pseudo random bit sequence (PRBS), and may be channel-encoded using modulation format of choice, e.g, DPSK or OOK.

FIG. 7B shows an example embodiment with a 96-bit header followed by K burst periods including A 32-bit burst-on blocks, and B 32-bit burst-off blocks per burst period. The fractional channel bits per frame is $$\frac{\text{Fractional channel data}}{\text{Frame}} = \frac{32KA}{32K(A+B)+96} = \frac{KA}{K(A+B)+3} \approx \frac{A}{A+B},$$

(for $K \gg 3$), where
A=number of 32-bit blocks per burst on, period
B=number of 32-bit blocks per dead or burst-off period,
K=number of burst periods per frame; and
Channel data bits per frame=32*K*A,
Dead slots per frame=32*K*B,
Total number of slots per frame=32*K*(A+B)+96.

In an example embodiment, K=256 and A=4, and the overhead due to the header is only ~0.3%, so that the ratio of A to A+B is substantially the burst-on duty cycle (DC).

At the full rate B=0, there are 32768 channel data bits per frame out of 32864 total number of slots. For B equal to 4, 12, 28 the corresponding channel rates are Rate-½, Rate-¼, and Rate-⅛, with 3, 6, and 9 dB duty cycles, respectively. For B=4096, the duty cycle is about 30 dB, or a factor of 1000.

A useful feature of this example embodiment is that the header adds negligible overhead to the data over a wide range of data rates, e.g., it requires <0.1 dB of received signal power or, equivalently, the header has <~2% duty cycle relative to the data transmitted. In an example embodiment using EDFA-based optical amplifiers, the burst-off dead length may be selected to be less than the upper-state lifetime (~1 msec) of the Erbium-doped fiber amplifier (EDFA) in order to avoid power inefficiencies and transient gain dynamics.

Figure 8:
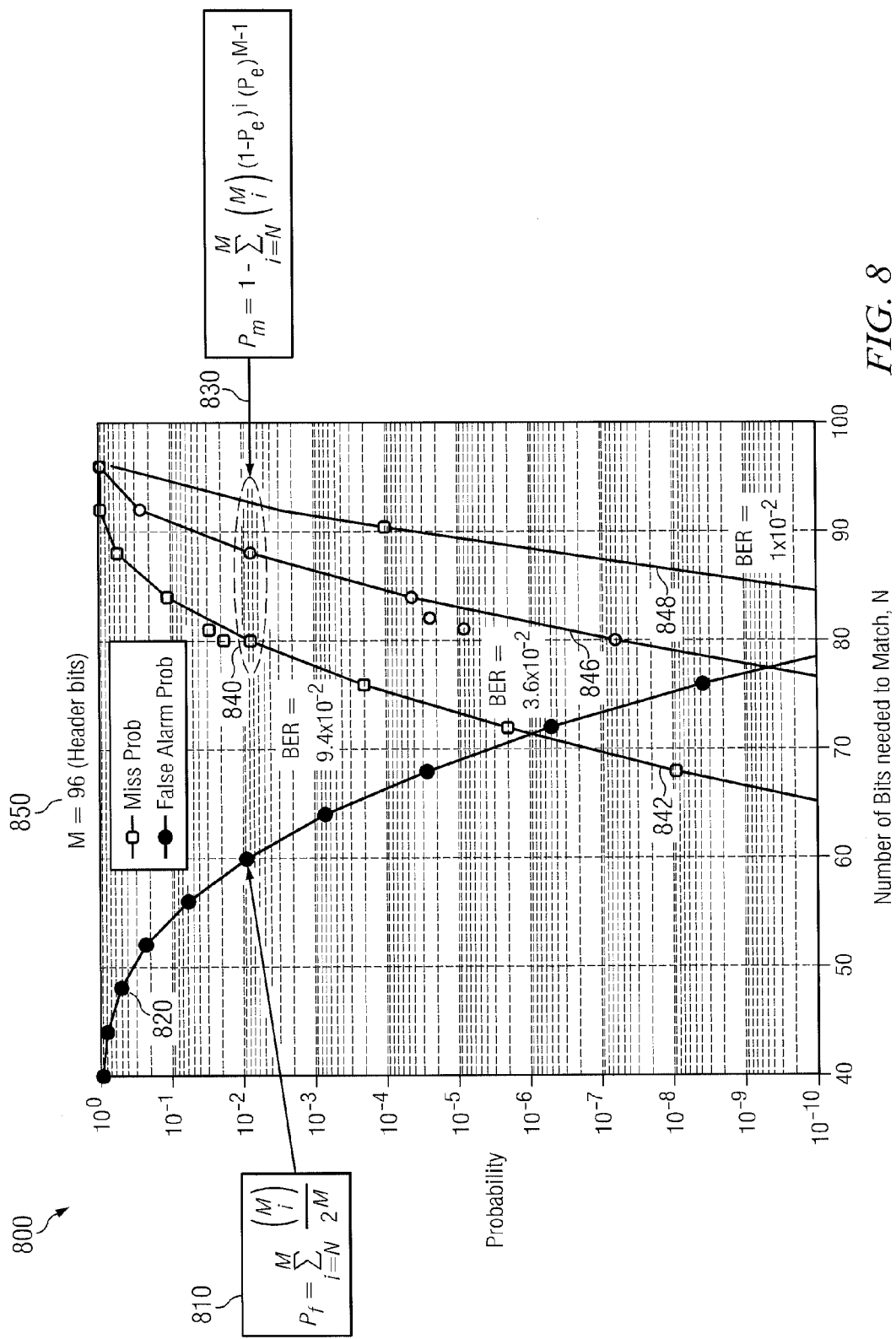
FIG. 8 is a diagram of framing synchronization performance employing an embodiment of the present invention.

FIG. 8 shows measured and calculated performance 800 of an embodiment in which the receiver identifies the start of the frame when N out of M 850 consecutive received bits match the predefined header pattern. The threshold N may be a selectable parameter, and the header pattern may be taken from a pseudo random bit sequence (PRBS) to facilitate alignment detection.

False alarm probability ($P_f$) 810 is the inaccurate synchronization on something other than the header (or other synchronization signal) and is given by $$P_f = \sum_{i=N}^{M} \frac{\binom{M}{i}}{2^M}.$$

The results for M=96 bit frame header 820 show $P_f$ trends, with $P_f<10^{-6}$ (one in a million) for N>72. For N>79, $P_f<10^{-10}$ (one in 10 billion). The approach may be extended to require synchronization over several frames to improve synchronization performance further. For a given M and N, $P_f$ may also be improved by a power of K by requiring K consecutive frames meet the N out of M bit criterion, i.e., $$P_f = \left[\sum_{i=N}^{M} \frac{\binom{M}{i}}{2^M}\right]^K$$

For example, for M=96, N=72, and requiring 2 successful consecutive frames (K=2), $P_f<10^{-12}$.

The miss probability ($P_m$) 830 is the failure to synchronize on the actual header (or other synchronization signal) and is given by $$P_m = 1 - \Sigma_{i=N}^{M} \binom{M}{i}(1-P_e)^i(P_e)^{M-i},$$

where $P_e$ is the channel bit error rate (BER). Calculated and measurements of $P_e$ 840 are in good agreement for measured BER=1×10⁻² 848, BER=3.6×10⁻² 846, and 9.4×10⁻² 842.

The false alarm probability is independent of BER while the miss probability increases with increasing BER. Parameters M, N, and K may be chosen to give negligible false alarm and miss probabilities such that synchronization may be achieved quickly with negligible impact on communications performance. Frame synchronization may be achieved at high bit error rates (>0.1) such that synchronization works even if the bit error rate is too high for reliable error-free communication.

Figure 9:
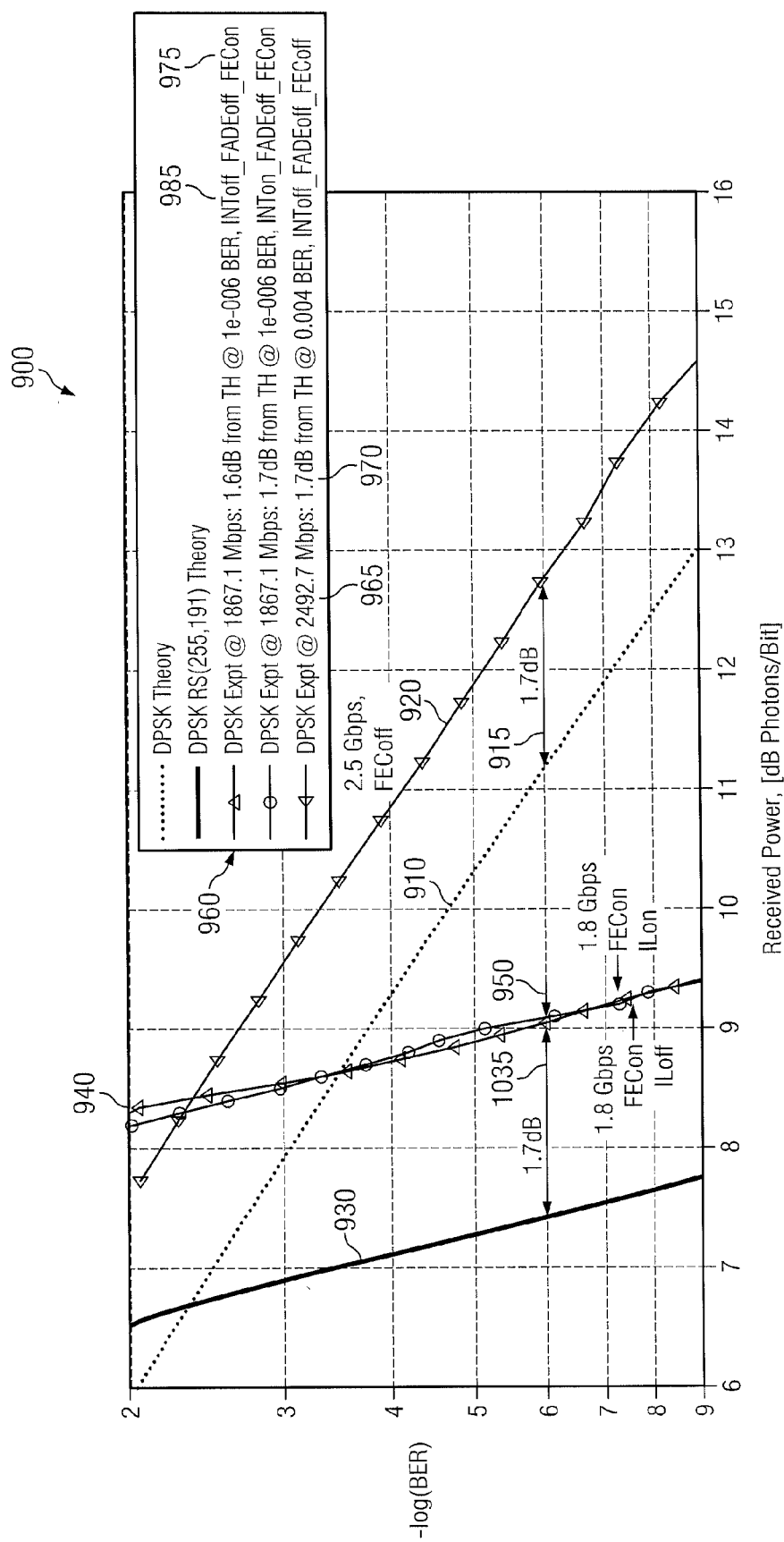
FIG. 9 is a diagram of communication performance of a transmitter and receiver pair employing an embodiment of the present invention.

FIG. 9 shows measured real-time burst-mode DPSK bit-error-rate (BER) performance 900 at the highest rate (e.g., full-rate or Rate-1) with and without Reed-Solomon RS(255, 191) forward error correction (FEC) using an example embodiment of this invention. The optical receiver used in these experiments did not use polarization filtering (which worsens sensitivity by ~0.4 dB relative to the single polarization case) and included a front-end optical circulator with ~0.4 dB insertion loss, reducing sensitivity by another ~0.4 dB). Therefore, for the same receiver configured with a polarization filter and without the lossy circulator, about 0.8 improvement in receiver sensitivity would be expected.

For comparison, theoretical BER DSPK performance curves without FEC 910 and with FEC 930 are shown to establish the relationship between theoretical and experimental performance over the various modes of operation, e.g., with and without FEC and interleaving over the static channel. Measured full-rate burst-mode DPSK BER performance curves 920, 940 are identified in the legend 960, which indicates the data rates 965 and dB distance from theory 970 at a BER, state of FEC (on or off) 975, and state of temporal interleaving function (on or off) 985. BER performance is measured over the static channel (with fade emulation off) in terms of received dB photons/bit=10*log 10(photons/bit), with measurement accuracy estimated to be ±0.15 dB (for the static channel). Measured experimental performance distance from theory (with FEC on, 910 versus 920 and with FEC off 930 versus 940) is ~1.7 dB, independent of the state of FEC or the interleaving function. The small 0.1 dB spread in repeated BER curves 950 is within measurement error, indicating the system performance is stable and repeatable. These consistent results indicate that system performance relative to theory (over the static channel) may be accurately estimated independent of the state of coding or interleaving.

Figure 10:
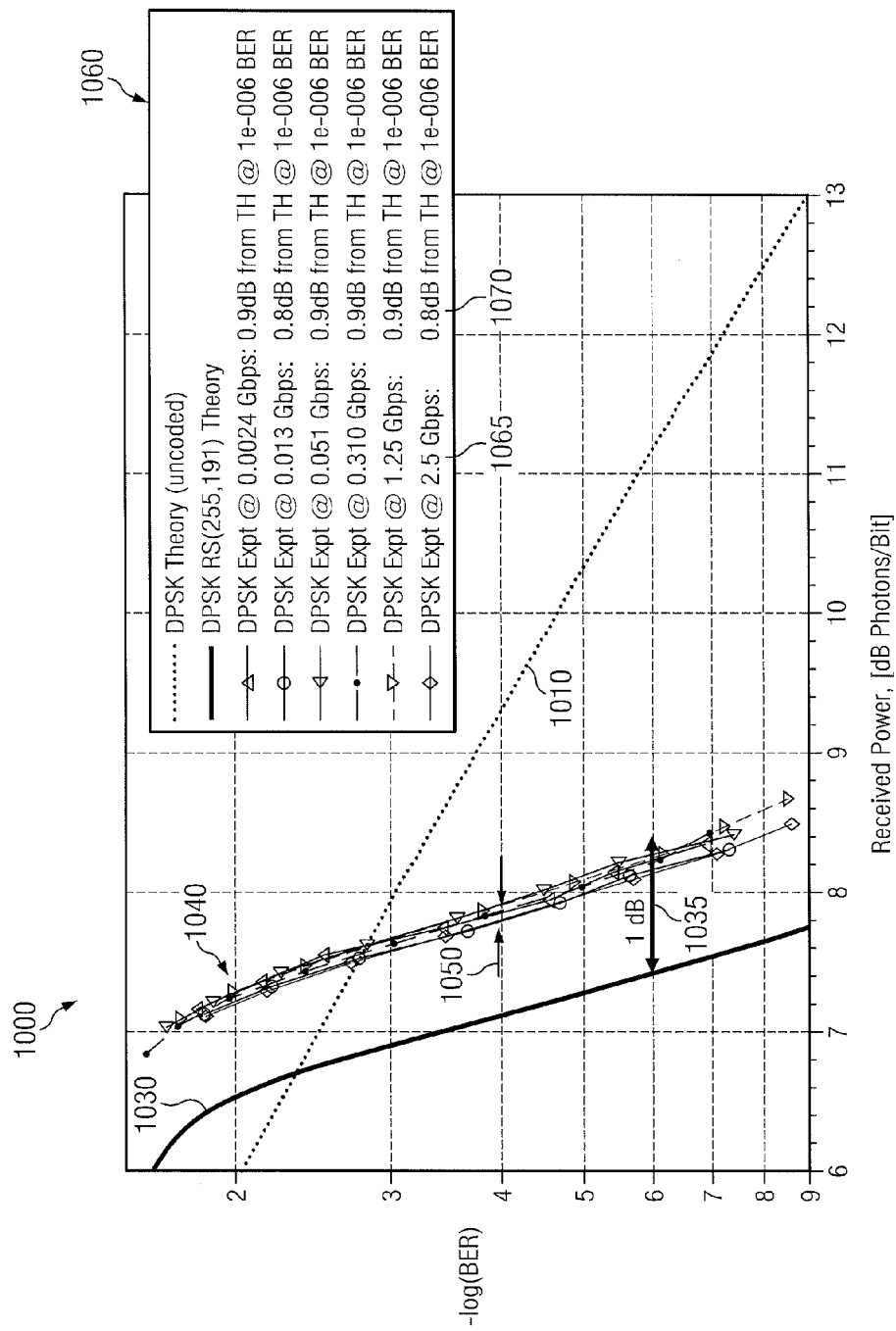
FIG. 10 is another diagram of communication performance of a transmitter and receiver pair employing an embodiment of the present invention.

FIG. 10 shows measured real-time Burst-mode DPSK BER performance 1000 with RS(255,191) FEC using an example embodiment of this invention. Note that the optical receiver used in these experiments used polarization filtering (which improves sensitivity by ~0.4 dB relative to the dual polarization case) and did not use an input optical circulator (reducing receiver insertion loss by ~0.4 dB), so that about 0.8 improvement in receiver sensitivity is expected relative to the measurements 900 shown in FIG. 9.

For comparison, theoretical BER DSPK performance curves without FEC 1010 and with FEC 1020 are also shown. Measured multi-rate burst-mode DPSK BER performance curves 1040 are identified in the legend 1060, which indicates the data rates 1065 and dB distance from theory 1070 at a 10⁻⁶ BER for data rates spanning from 0.0024 Gbps to 2.5 Gbps (equivalently 2.4 Mbps to 2400 Mbps). BER performance is measured over the static channel is in terms of received dB photons/bit=10*log 10(photons/bit) with measurement accuracy estimated to be ±0.15 dB over the static channel Relative to the theoretical RS(255,191) performance 1030, measured experimental performance is within ~1 dB of theory, corresponding to ~7.5 photons/bit at a 10⁻⁹ BER at all data rates from 2.4 Mbps to 2500 Mbps with the RS(255,191) FEC. The small spread in BER curves 1050 indicates little or no performance penalty as the rates span a range greater than a factor of 1000 (30 dB). To avoid performance penalties <0.2 dB, abs(ER)>abs(DC)+15 dB. This implies that the burst off-to-on modulation ER is greater than 30 dB+15 dB=45 dB.

Figure 11:
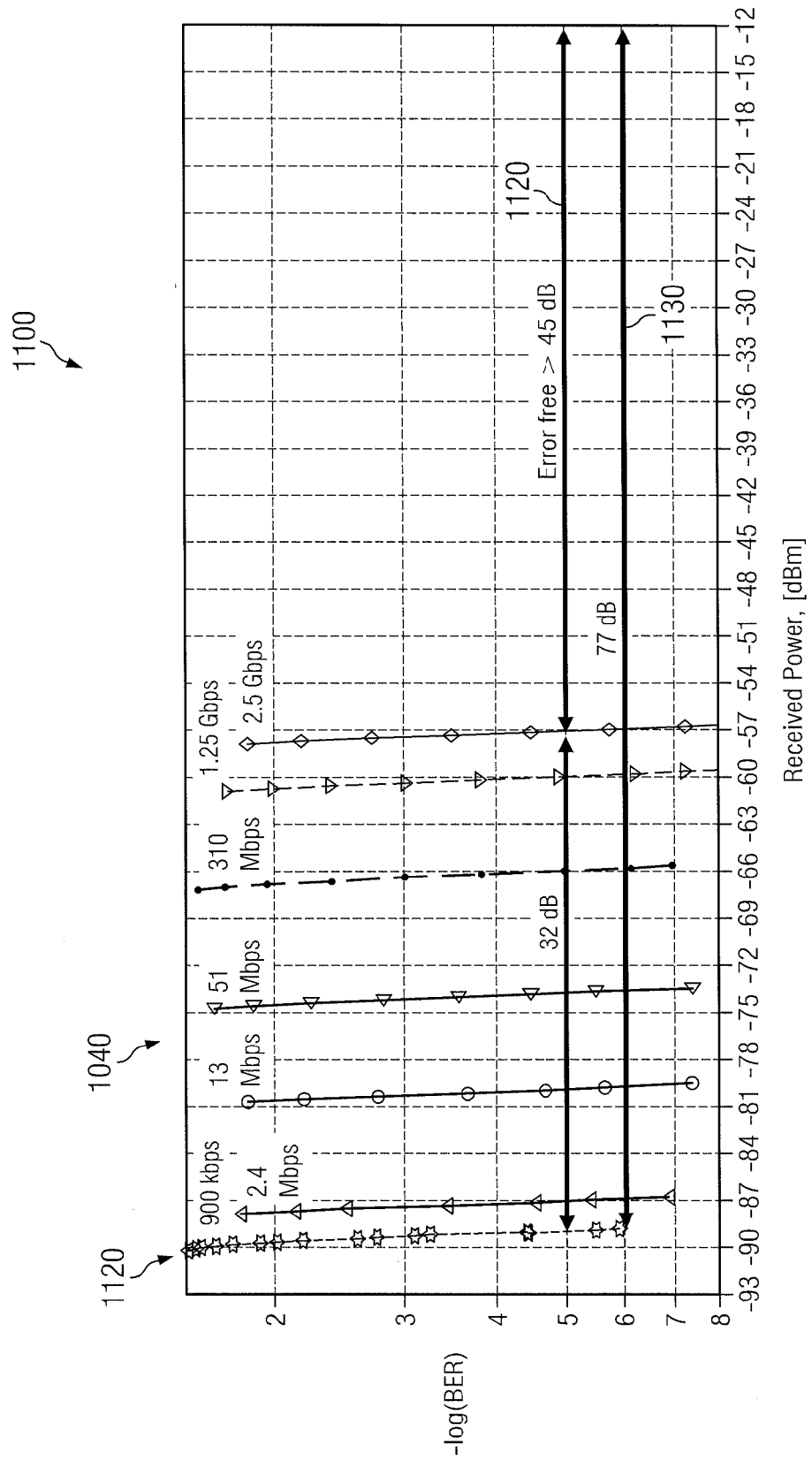
FIG. 11 is yet another diagram of communication performance of a transmitter and receiver pair employing an embodiment of the present invention.

FIG. 11 shows the same data curves 1030 from FIG. 10 plotted against received power in dBm. In addition, a 900 kbps BER curve 1120 is included which increases the range of data rates using an example embodiment of this invention to 32 dB. Furthermore, at high data rates, the error-free dynamic range is extended more than 45 dB 1120, a characteristic that is enhanced by gain saturation due to high gain and narrow-band substantially-matched optical filtering in the EDFA preamplifier used in the example embodiment of this invention. When combined with the 32 dB range of data rates, the error free operational range is extended to 77 dB, a 50 dB improvement over prior wide-dynamic range (packet-switched) demonstrations.

These data 1000 and 1100 show an important benefit of embodiments of this invention—that a single transmitter and receiver pair may operate over a wide range of channel losses exceeding 30 dB with little or no performance penalty. Moreover, error-free performance is maintained over a wider range of 77 dB. Note that by combining these aspects of embodiments of the present invention with WDM-DSPK, a multi-rate multi-channel WDM-DPSK-based transmitter and receiver pair can achieve a range of data rates of 77 dB by leveraging the 45 dB of additional error-free margin to extend the range of rates. Separate WDM channels may operate in a dependent mode (e.g., each of the WDM-channels transmits a portion of a common data stream) or independently, in which each WDM channel may operate at its own burst-mode rate, thereby providing additional flexibility and versatility for systems 10, 35, 40, and 60; optical transceivers 200, and optical transmitter/receiver pairs employing an embodiment of the present invention.

Figure 12:
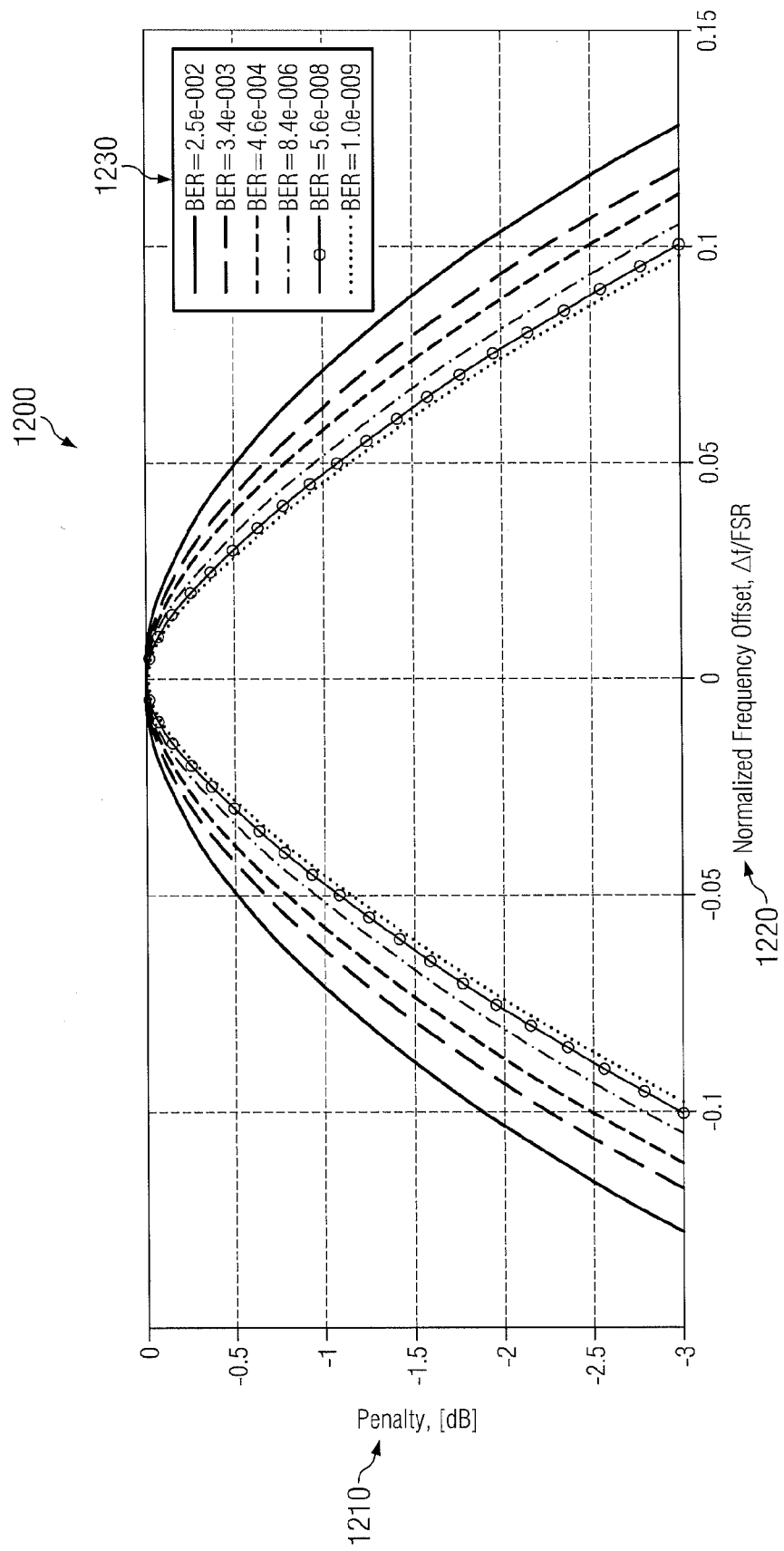
FIG. 12 is a diagram of performance sensitivities that may be avoided by embodiments of the present invention.

FIG. 12 shows the 2-DPSK tolerance of signal wavelength to DI alignment 1200, plotting the misalignment penalty in dB 1210 versus the normalized frequency offset Δf/FSR 1220 for various BER operating points between $2.5 \times 10^{-2}$ and $1 \times 10^{-9}$ 1230. In certain embodiments, to keep the penalty less than ½ dB, misalignments need to be less than +3% to ±5% of the interferometer FSR. For conventional DPSK receivers, the FSR determines the lowest data rate that may be demodulated. For a conventional DPSK receiver operating at 1 Gbps using 1 GHz DI demodulation, this corresponds to laser wavelength and DI alignments as low as 30 MHz, or about ¼ picometer of relative wavelength alignment, which is extremely challenging. And, extending the rate down to the 1 Mbps regime using the conventional approach increases the difficulty by a factor of 1000, requiring less than 30 kHz relative alignment to avoid the ½ dB penalty.

In contrast, the multi-rate burst-mode approach of embodiments of the present invention demonstrated Gbps to Mbps-class 2-DPSK performance within ~1 dB of theory, comparable to the most sensitive 2-DPSK performance reported, with little or no degradation at the lower rates. Thus, embodiments of the present invention provide a means of implementing a transmitter and receiver pair that may operate with near-theoretical performance over an extended range that provide performance exceeding a 30 dB range of data rates. Furthermore, embodiments of the invention enable commonly used, high sensitivity, modulation format to operate at new data rates, orders of magnitude lower than previously thought feasible using conventional techniques known in the art.

Figure 13:
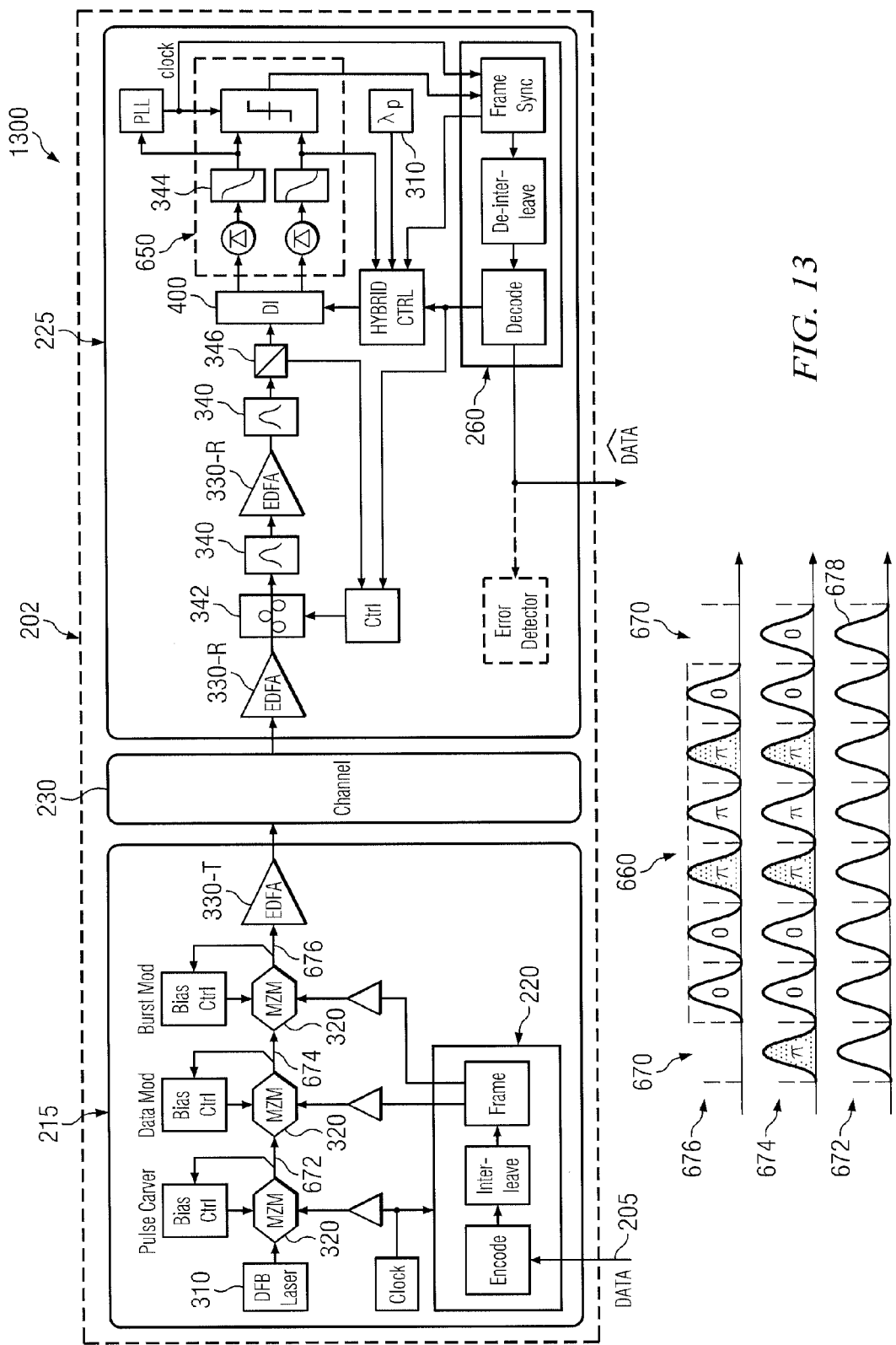
FIG. 13 is a diagram of a transmitter and receiver pair employing an embodiment of the present invention.

FIG. 13 shows a diagram 1300 of an example embodiment of this invention which may include a transmitter/receiver pair 202 that may further include an optical transmitter 215, an optical channel 230, and an optical receiver 225. The optical transmitter may include a laser 310, modulation elements 320, and an optical amplifier 330-T. The laser may be operated in continuous wave (CW) operation. The laser may further have a well-defined and stable center wavelength to facilitate alignment with elements within the optical receiver 225. In an example embodiment, the laser wavelength can be tuned to a preselected wavelength within 10 MHz of accuracy. The laser output may be modulated by one or more modulation elements 230 that may generate pulse carved 672, data modulated 676, and on-off burst windowed optical waveforms 676. The pulse carved waveforms 672 may include RZ waveforms, and may have a Gaussian-like pulse shape 678 similar to that of RZ33, RZ40, RZ50, or raised-cosine shapes that are known in the art. In an example embodiment, a single modulation element may generate pulse carving 672, data modulation 674, and burst windowing waveforms. The modulation elements may include one or more Mach-Zehnder-type modulators. An example embodiment with only one modulation element uses a single push-pull Mach-Zhender modulator to generate pulse carving 672, data modulation 674, and burst windowing waveforms 676 with the use of tri-state drive signals. In this case, the upper state generates, for example, a pulse with a pi phase shift, the middle-state generates a transmission null (used for the burst-off time), and the lower state generates a pulse with a zero-phase shift suitable for use in PSK communication systems. An advantage of this configuration (due to the symmetry of the waveforms) is that the modulator is biased at a transmission null, thereby simplifying the bias control and improving the ability to generate good modulation ER that may be important for use with low-duty-cycle low-data-rate operation.

The optical receiver 225 may include multiple stages of optical amplifiers 330-R, polarization maintaining or polarization controlling elements 342, and/or optical filtering 340. The net optical filtering due to the cascade of more than one optical filter may be substantially-matched to the transmitter-generated pulse shape 678. The optical receiver may also include a polarizing filter element 346. The optical receive may further include feedback control to adjust the polarization control element 342 to optimize alignment of the optical signal relative to the polarization filter 346. The optical receiver may include coherent or interferometric demodulation elements, such as a DI 400.

The optical receiver may further include stabilization elements and feedback control to tune a DI 400 to a preselected wavelength. The feedback control may include pilot-based control, in which a laser 310 with a well-defined optical wavelength is used as a stabilizing reference to which the DI is aligned, with or without the absence of an incoming optical received signal. The feedback control may further control the DI based on the incoming optical signal when the signal or corresponding BER is/are acceptably strong. The signal-based control may be used to correct for slow drift of a transmit or pilot laser 310 or Doppler on an incoming signal. The combined signal- and pilot-based DI control is referred to as hybrid control. Feedback elements to the hybrid control may include BER obtained via telemetry, header error rate estimate, FEC-based error-rate estimates, or received signal power estimates. The optical receiver may also perform balanced detection 650. The optical receiver may also include polarization diversity reception known in the art. The optical receiver may also include deformatting elements that may include frame synchronization, de-interleaving, and decoding functions that further process the demodulated optical signal and generate the output data.

The optical receiver may be configured to have high optical gain and narrow-band, substantially-matched, optical and/or polarization filtering so that it may operate in a saturated mode in the presence of large optical signals, which may extend the dynamic range of powers that the receiver may operate with little or no performance penalty. The optical receiver may further have selectable (or adjustable) gain elements that may be used to extend the dynamic range of power levels and/or data rates. In an example embodiment, the optical receiver uses three gain stages, with each stage having more than 20 dB small signal optical gain, similar to the optical receiver 225 in FIG. 14. The optical receiver may also use the gain in the third gain stage as a selectable gain element. The first and second optical stages may be filtered with substantially-matched narrow-band optical filters or polarization filters. The net amplification within the optical receiver may have similar gain characteristics 1500 as shown in FIG. 15.

The use of substantially-matched optical filters important for two reasons: 1) it improves receiver sensitivity by nearly-optimally removing out-of-signal band noise, and 2) when used after the first optical gain stage, it may reduce the amount of amount of amplified spontaneous emission (ASE) noise from the first-stage output so that it may not be amplified in subsequent stages. As a result, for low optical signal powers, the net saturation characteristics of a multi-stage optical amplifier (as shown in FIG. 15) are dependent on the weaker optical signals, thereby extending the useful dynamic range of a receiver employing a variable duty cycle modulation of the present invention.

The concept of matched filtering is well known in the art. Substantially-matched filtering implies a relatively small communication penalty is incurred due to additional noise (due to a wider-than necessary optical filter) entering the receiver decision elements, an amount for example that is approximately less than 3 dB.

Figure 14:
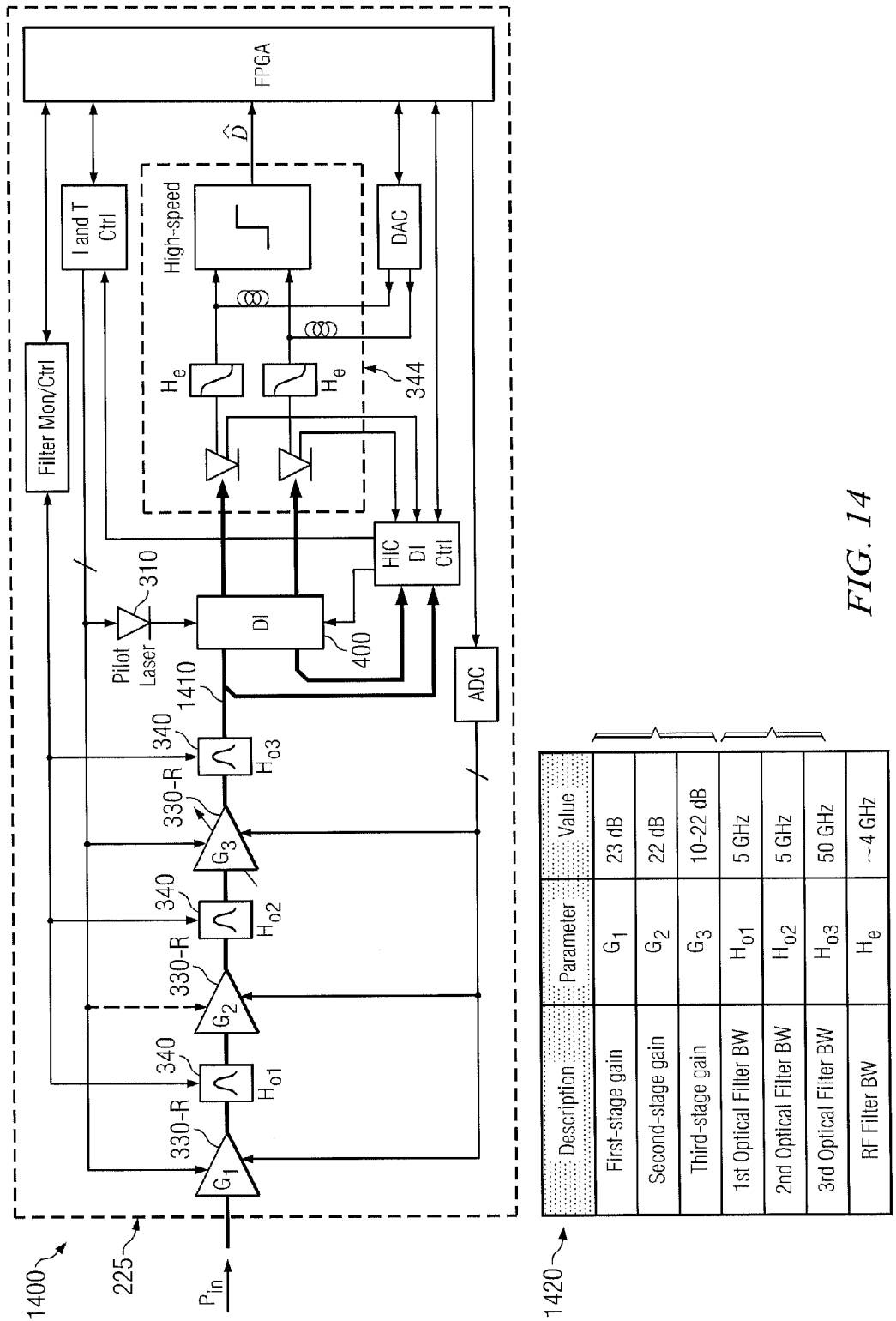
FIG. 14 is a schematic diagram of an optical receiver according to an embodiment of the invention.
Figure 15:
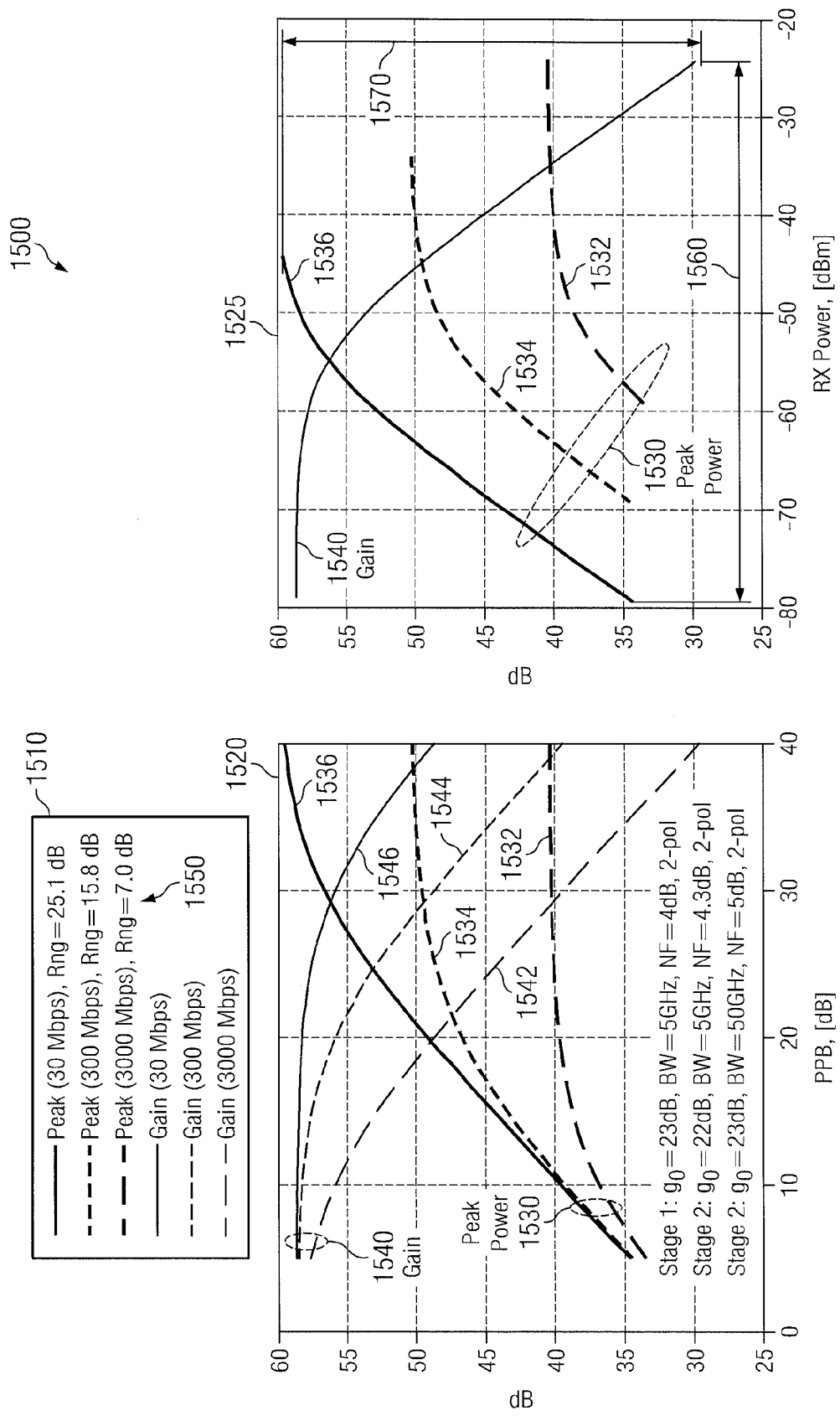
FIG. 15 is a set of simulated EDFA preamplifier gain curves for an EDFA preamplifier that may be employed in the optical receiver.

FIG. 14 shows another example embodiment 1400 of an optical receiver 225 configured with three optical gain stages 330-R, with respective optical power gains $G_1$, $G_2$, and $G_3$, followed by optical filters 340 with optical bandwidth $H_{O1}$, $H_{O2}$, and $H_{O3}$, respectively. Parameter descriptions and approximate values are shown in chart 1420. The third gain stage, G3, may be configured to have an adjustable gain, which may be controlled, for example, by adjusting the pump power into the optical gain media. Calculations of net gain and peak output power 1410 prior to the detection elements 344 for this embodiment are shown in FIG. 15 for multiple burst-mode data rates of embodiments of the present invention and power levels spanning a 55 dB range. In this example embodiment, the high optical gain combined with narrow-band, substantially-matched, optical filtering provides substantial automatic gain control. Combined with selection of the third-stage gain, G3, this example embodiment may enable little or no performance penalty for wide dynamic ranges in data rates and input powers, which may exceed 77 dB, as illustrated in the performance curves shown in FIG. 10 and FIG. 11.

FIG. 15 shows calculations 1500 of the net optical gain 1540 and peak output power 1530 of an example embodiment of the present invention using multi-rate, burst-mode, optical communication waveforms in which the data rate is a function of the burst-on duty cycle. The two charts 1520 and 1525 show the same gain and peak output power data plotted against received photons/bit (PPB) 1520 and received optical power [dBm] 1525. The received dB PPB for each of the data rates is varied over a 35 dB dynamic range, from 5 dB PPB to 40 dB PPB. The calculations assume an optical receiver 225, which includes an average power limited optical pre-amplifier including a multi-gain-stage EDFA configuration closely approximating the three-gain-stage optical receiver 1400 in FIG. 14, receiving Gaussian-like RZ50 pulses at a slot rate of GHz (3000 MHz), with substantially-matched optical filtering. The gain and relative peak power are in reference to the three-gain-stage output 1410, prior to DI 400 in FIG. 14.

Three burst-mode data rates are simulated: Rate-1 (full-rate) at 3000 Mbps, Rate-1/10 at 300 Mbps, and Rate-1/100 at 3 Mbps, as indicated in the common legend 1510 (for both charts 1520, 1525). Corresponding gain and peak powers for each of the simulated rates are identified as follows: 3000 Mbps gain 1542 and peak power 1532; 30 Mbps gain 1544 and peak power 1534; and 3 Mbps gain 1546 and peak power 1536.

For a given dB PPB in 1520, the corresponding optical power (dBm) in chart 1525 is dependent on the data rate, so that the received optical powers for each of the three simulated burst-mode data rates span a dynamic range of 35 dB individually. But the net dynamic range of received optical power for all the rates is extended by another 20 dB to 55 dB 1560.

The legend 1510 also shows the dB range of peak optical power 1550, which corresponds to the max-min for each data rate peak power curve. While the received dB PPB for each rate changes by 35 dB, dynamic range of each of the rates changes by 7.0 dB 1532, 15.8 dB 1534, and 25.1 dB 1536 for the 3000 Mbps, 300 Mbps, and 30 Mbps rates, respectively, showing the compression that occurs due to saturation in the narrow-band, (substantially-matched) filtered, high-gain, optical receiver. The compression is largest for the highest rate with the largest received optical powers and the least for the lowest rate with the lowest received optical power, with the compression or reduced dynamic range of output power between ~10 and 28 dB. The aggregate range of peak powers at the optical receiver input 1560 is 55 dB, whereas the aggregate range of output powers 1570 is only ~30 dB, thus providing a ~25 dB reduction of peak optical power incident to the balanced detection elements 344. Thus, the high gain, substantially-matched, narrow-band, optical filtered receiver provides a substantial amount of automatic gain control by design, without requiring additional feedback mechanisms.

To reduce the dynamic range 1570 at the input to the detection elements 344 further, the optical receiver may be configured to have lower net gain for the lower data rates, which may be achieved, for example, by selecting the gain of the third stage of the receiver in FIG. 14. As confirmed in the multi-rate performance curves 1040 in FIG. 10 and FIG. 11, this may be performed with little or no performance penalty for data rates spanning more than 30 dB of rates, and power levels that span approximately 77 dB.

Figure 16:
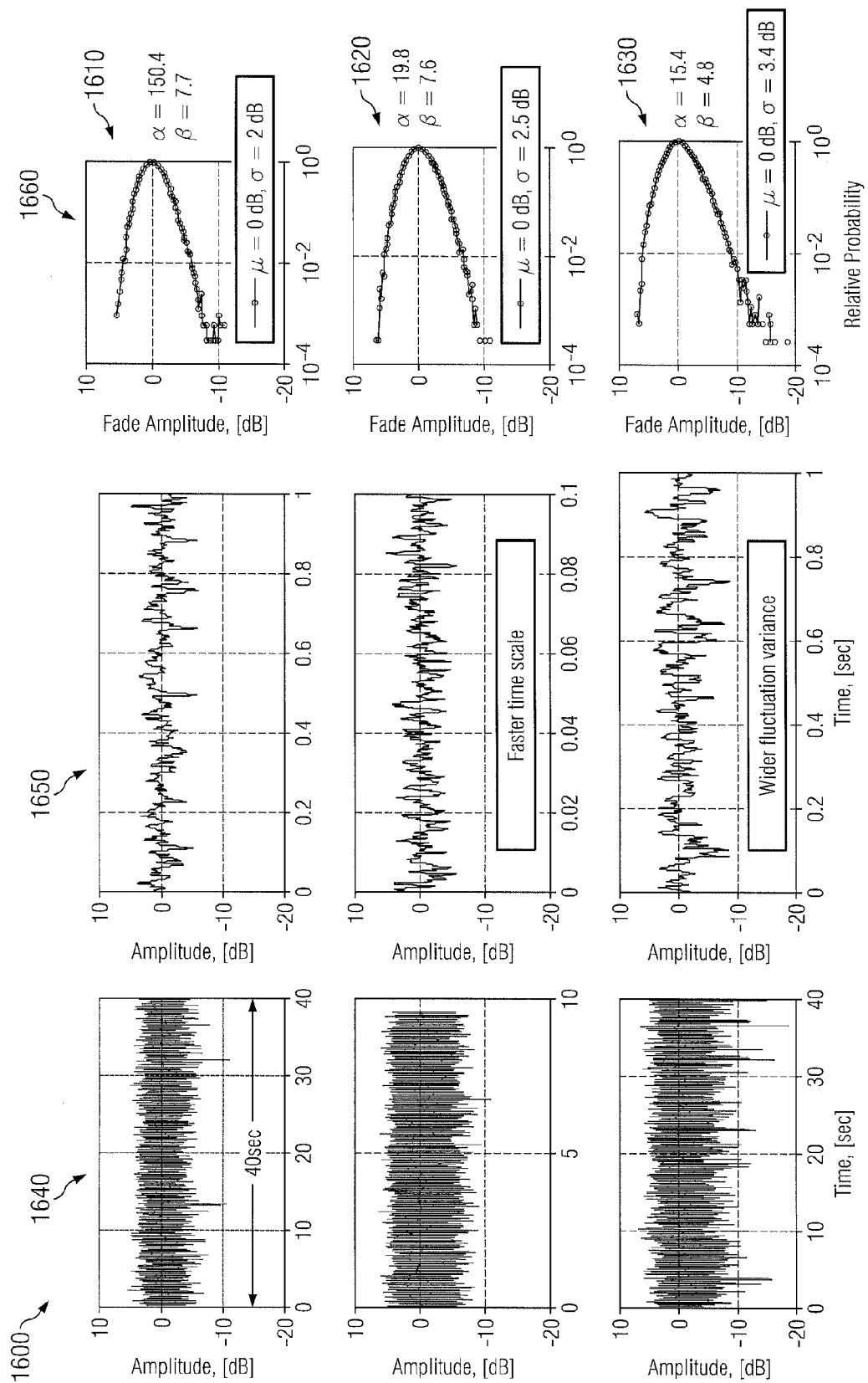
FIG. 16 is a set of plots representing three dynamic fading profiles in which embodiments of the invention provides robustness.

FIG. 16 shows three representative dynamic fade profiles, 1610, 1620, and 1630, which were used to measure dynamic communication performance of an example, multi-rate, burst-mode, optical communication, transmitter/receiver pair 202 of an embodiment of the present invention. Time-domain traces for each profile plotting dB attenuation as a function of time are in column 1640. Expanded time-domain views of these traces are in column 1650, and probability distribution functions (PDFs) for each are column 1660. The alpha (α) and beta (β) fit-parameters to these gamma-gamma distributed time-series are also shown.

Figure 17:
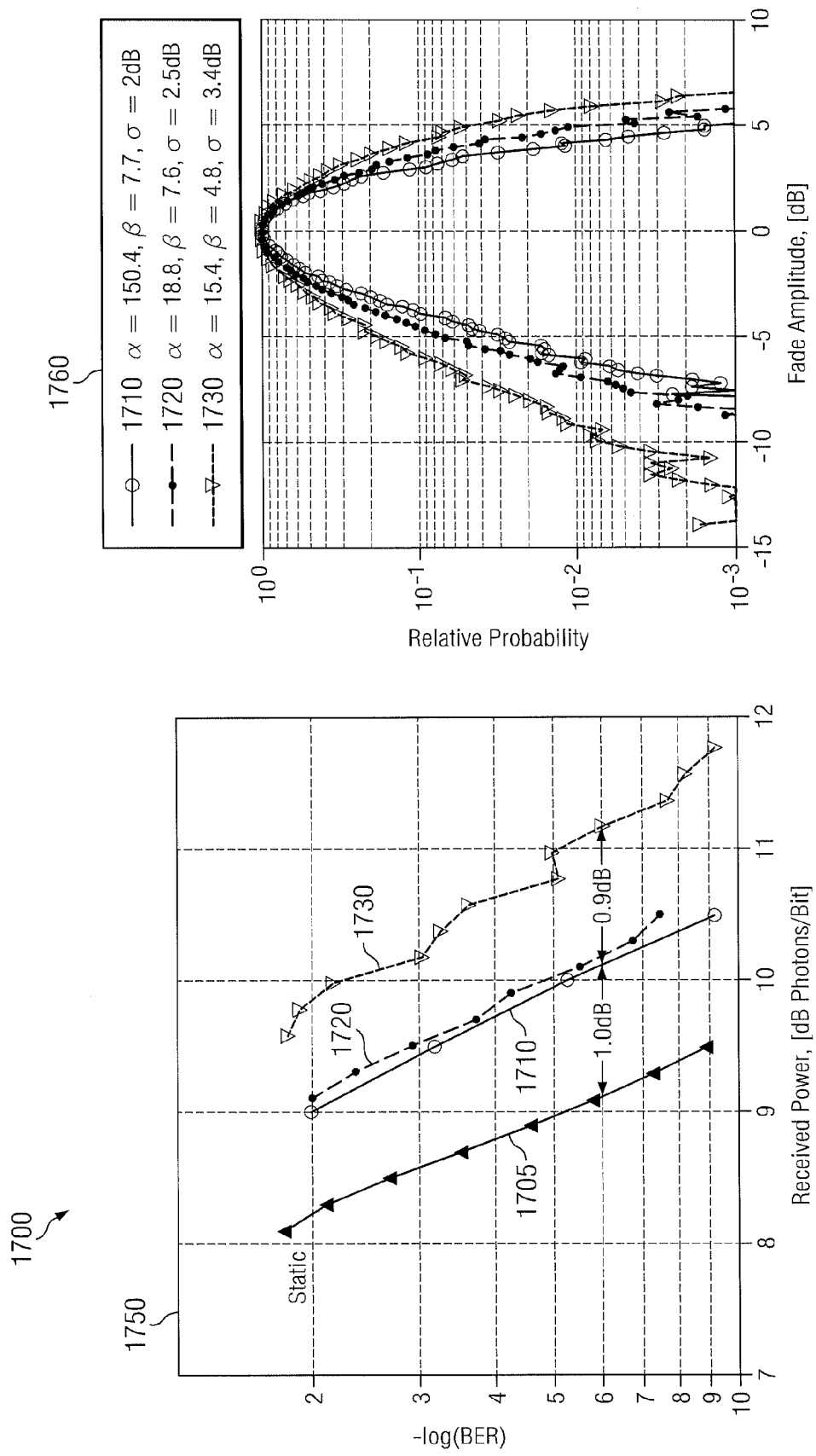
FIG. 17 is a set of plots that represent DPSK performance through fading channels with performance of an embodiment of the invention compared to other systems.

FIG. 17 shows measured dynamic communication performance of an example multi-rate, burst-mode, optical communication, transmitter/receiver pair 202 of an embodiment of the present invention for profiles 1610, 1620, and 1630 of FIG. 16, and corresponding performance designated by profiles 1710, 1720, and 1730, respectively in FIG. 17. Measured BER curves 1750 show performance over a static channel 1705 as a baseline reference. The dynamic measurements were performed with RS(255,191); FEC and interleaving mitigate channel effects. The attenuation profiles dynamic range (at $10^{-3}$ probability) is approximately 13 dB, 15 dB, and 19 dB for 1710, 1720, and 1730, respectively. Corresponding alpha ($\alpha$) and beta ($\beta$) gamma-gamma fit-parameters along with the dB standard deviation ($\sigma$) are given in the legend 1760. Relative to baseline measurements over the static channel 1705, degradation was only ~1 dB for 1710 and 1720, and less than 2 dB for 1730, illustrating the ability of an optical transmitter and receiver pair 202 of an embodiment of the present invention to operate over a wide dynamic range of data rates and received power levels through widely fluctuating optical signals (8 to 15 dB fades and 5 to 7 dB surges) with relatively small performance degradations.

It should be understood that various aspects of embodiments of the present invention may be implemented in hardware, firmware, and software. If implemented in software, the software may be any suitable language that can cause a processor to execute embodiments or portions of embodiments disclosed herein or otherwise known. The software may be stored on any processor- or device-readable medium, such as RAM or ROM.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

The invention claimed is:

1. An optical communications system, comprising:
an optical transmitter/receiver pair configured, or operable to be configured, to communicate via a dedicated communications path extending an entire distance between a transmitter and a receiver of the optical transmitter/receiver pair in a given direction along the dedicated communications path, the transmitter/receiver pair being further configured, or operable to be configured, to operate at a selectable data rate with data transmitted in bursts, the data rate being a function of a burst-on duty cycle, and the transmitter being average power limited.

2. The system according to claim 1 wherein the data transmitted in bursts is accompanied by a periodic header.

3. The system according to claim 1, wherein the transmitter/receiver pair are configured to operate based on differentially encoded phase-shift keying and wherein the receiver is configured to use a fixed interferometric demodulator.

4. The system according to claim 1 wherein the data rate is adjusted depending on channel conditions to accommodate transmission rate, throughput, security at the receiver, or signal-to-noise ratio.

5. The system according to claim 4 wherein the receiver or an external manager sends data via a return link or supervisory channel to change the rate at which the transmitter transmits data.

6. The system according to claim 1 wherein the transmitter includes an interleaver configured to spread out data bits in time and wherein the receiver includes a de-interleaver configured to perform a complementary function.

7. The system according to claim 1 wherein the burst-on length is selectable.

8. The system according to claim 1 wherein a burst-off time is less than or equal to 100 microseconds.

9. The system according to claim 1 wherein optical signals carrying the data transmitted in bursts have a transmission extinction ratio greater than the burst mode duty cycle plus 3 dB.

10. The system according to claim 1 wherein a penalty is less than 2 dB for a range of duty cycles of greater than 25 dB.

11. The system according to claim 1 wherein the transmitter and receiver include substantially matched filters and wherein the receiver further includes a high gain preamplifier.

12. The system according to claim 11 wherein the receiver includes a polarization filtering element.

13. The system according to claim 1 wherein the receiver is configured to learn error rate from a header or forward error correction data independent of the transmitter and is further configured to use the error rate internally or notify the transmitter of the error rate.

14. The system according to claim 1 wherein the receiver is an interferometric receiver and is pilot tone stabilized.

15. The system according to claim 1 wherein the receiver is a phase sensitive or a coherent receiver.

16. The system according to claim 15 wherein the coherent receiver is configured to receive a signal with a modulation selected from a group consisting of: M-Phase Shift Keying (M-PSK), M-Quadrature Amplitude Modulation (M-QAM), polarization modulation, Orthogonal Frequency Division Multiplexing (OFDM) or polarization multiplexing or combination thereof.

17. The system according to claim 1 wherein the transmitter/receiver pair is configured to use forward error correction coding and interleaving.

18. The system according to claim 1 wherein the transmitter and receiver are configured to communicate via a free space medium.

19. The system according to claim 1 wherein the transmitter and receiver are configured to communicate via a guided wave channel.

20. The system according to claim 19 wherein the guided wave channel is a multi-mode guided wave channel.

21. The system according to claim 1 wherein the transmitter/receiver pair are configured to communicate up to a maximum rate equal to a free spectral range of an interferometric-based receiver demodulator, and wherein the transmitter/receiver pair are still further configured to communicate at lower rates than the maximum rate equal to the free spectral range by fractions equal to the burst-on duty cycle.

22. The system according to claim 1 wherein the duty cycle is 100 percent and wherein the optical transmitter/receiver pair are further configured to operate at an increased data rate through non-adjacent Differential Phase Shift Keying (DPSK) signaling.

23. The system according to claim 1 wherein the transmitter uses a linewidth of a transmitter laser that is greater than or equal to 0.1% of the data rate.

24. The system according to claim 3 wherein misalignment of the interferometric demodulator and incoming wavelength is less than 5% of the free spectral range.

25. The system according to claim 24 wherein misalignment of the interferometric demodulator and incoming wavelength is greater than 1% of the selected data rate.

26. The system according to claim 1 wherein the transmitter includes a single modulator configured to perform pulse carving, data modulating, and window modulating, or combination of at least two thereof.

27. The system according to claim 1 wherein the receiver includes a preamplifier with adjustable gain to enable preamplification without saturation.

28. The system according to claim 27 wherein the preamplifier is configured to avoid saturation penalties and extend dynamic range as a function of the duty cycle.

29. The system according to claim 1 wherein the transmitter/receiver pair are components in a bi-directional system of transceiver pairs.

30. The system according to claim 1 wherein the transmitter/receiver pair is configured to communicate using at least one of the following modulation formats: Wavelength Division Multiplexing (WDM), Differential Phase Shift Keying (DPSK), Pulse Position Modulation (PPM), or Pulse Code Modulation (PCM).

31. The system according to claim 1, wherein the dedicated communications path is a first dedicated communications path and further comprising an additional transmitter/receiver pair configured to communicate via a second dedicated communications path, coincidental with the first dedicated communications path, in a direction along the second communications path opposite the given direction.

32. The system according to claim 1 wherein the transmitter/receiver pair are configured to communicate up to a maximum rate, and wherein the transmitter/receiver pair are still further configured to communicate at lower rates than the maximum rate by fractions equal to the burst-on duty cycle.

33. The system of claim 1, wherein at least one of the transmitter and receiver is mountable on a mobile platform and configured to communicate via the dedicated communications path in a given direction along the dedicated communications path while in motion.

34. A method of communicating in an optical communications system, the method comprising:
transmitting, by an optical transmitter, via a dedicated communications path in a given direction along the dedicated communications path, transmitting being at a selectable data rate with data transmitted in bursts using average power limited waveforms, the data rate being a function of a burst-on duty cycle; and
receiving, by an optical receiver, the data at the selectable data rate via the dedicated communications path, the dedicated communications path extending an entire distance between the optical transmitter and optical receiver.

35. The method of claim 34, wherein the dedicated communications path is a first dedicated communications path and further comprising transmitting via a second dedicated communications path, coincidental with the first dedicated communications path, in a direction along the second dedicated communications path opposite the given direction, the method further comprising receiving via the second dedicated communications path.

36. The method of claim 34, transmitting at the selectable data rate includes transmitting at up to a maximum rate or at lower rates than the maximum rate by fractions equal to the burst-on duty cycle.

37. The method of claim 34, wherein at least one of transmitting via the dedicated communications path and receiving via the dedicated communications path includes, respectively, transmitting from or receiving at a position changing with time.

38. The method according to claim 34 further comprising transmitting a periodic header with the data transmitted in bursts and receiving the periodic header.

39. The method according to claim 34 further comprising transmitting the data using differentially encoded phase-shift keying and wherein receiving the data includes using fixed interferometric demodulation.

40. The method according to claim 34 further comprising adjusting the data rate depending on channel conditions to accommodate transmission rate, throughput, security at the receiver, or signal-to-noise ratio.

41. The method according to claim 40 further comprising sending data via a return link or supervisory channel to change the rate of the transmitting.

42. The method according to claim 34 wherein the transmitting includes interleaving to spread out data bits in time and wherein the receiving includes de-interleaving configured to perform a complementary function.

43. The method according to claim 34 wherein the burst-on length is selectable.

44. The method according to claim 34 wherein a burst-off time is less than or equal to 100 microseconds.

45. The method according to claim 34 wherein optical signals carrying the data transmitted in bursts have a transmission extinction ratio greater than the burst mode duty cycle plus 3 dB.

46. The method according to claim 34 wherein a penalty is less than 2 dB for a range of duty cycles of greater than 25 dB.

47. The method according to claim 34 wherein the transmitting and receiving include substantially matched filtering and wherein the receiving further includes high gain preamplifying.

48. The method according to claim 47 wherein the receiving further includes polarization filtering.

49. The method according to claim 34 wherein the receiving includes learning error rate from a header or forward error correction data independent of the transmitting and wherein the receiving further uses the error rate internally or causes and adjustment to a transmitter transmitting the error rate.

50. The method according to claim 34 wherein the receiving includes interferometric receiving and is pilot tone stabilized.

51. The method according to claim 34 wherein the receiving is phase sensitive or coherent.

52. method according to claim 51 wherein coherent receiving is configured to receive a signal with a modulation selected from a group consisting of: M-Phase Shift Keying (M-PSK), M-Quadrature Amplitude Modulation (M-QAM), polarization modulation, Orthogonal Frequency Divisional Multiplexing (OFDM), polarization multiplexing, or combination thereof.

53. The method according to claim 34 further comprising using forward error correction coding and interleaving.

54. The method according to claim 34 wherein the transmitting and receiving are performed via a free space medium.

55. The method according to claim 34 wherein the transmitting and receiving are performed via a guided wave channel.

56. The method according to claim 55 wherein the guided wave channel is a multi-mode guided wave channel.

57. The method according to claim 56 wherein the transmitting and receiving enable communicating up to a maximum rate equal to a free spectral range of an interferometric-based receiver demodulator, and wherein the transmitting and receiving are still further configured to enable communicating at lower rates than the maximum rate by fractions equal to the burst-on duty cycle.

58. The method according to claim 34 wherein the duty cycle is 100 percent and further including increasing the data rate using non-adjacent Differential Phase Shift Keying (DPSK) signaling.

59. The method according to claim 34 wherein the transmitting includes using a linewidth of a transmitter laser that is greater than or equal to 0.1% of the data rate.

60. The method according to claim 39 wherein misalignment of the fixed interferomtric demodulation and incoming wavelength is less than 5% of the free spectral range.

61. The method according to claim 60 wherein misalignment of the fixed interferomtric demodulation and incoming wavelength is greater than 1% of the selected data rate.

62. The method according to claim 34 wherein the transmitting includes pulse carving, data modulating, and window modulating, or combination of at least two thereof.

63. The method according to claim 34 wherein the receiving includes preamplifying with adjustable gain to enable preamplification without saturation.

64. The method according to claim 63 wherein the preamplifying is configured to avoid saturation penalties and extend dynamic range as a function of the duty cycle.

65. The method according to claim 34 wherein the transmitting and receiving occur bi-directionally.

66. The method according to claim 34 wherein the transmitting and receiving are configured to enable communicating using at least one of the following modulation formats: Wavelength Division Multiplexing (WDM), Differential Phase Shift Keying (DPSK), Pulse Position Modulation (PPM), or Pulse Code Modulation (PCM).

67. An optical communications system, comprising:

means for optically transmitting data via a dedicated communications path in a given direction along the dedicated communications path in bursts at a selectable data rate using average power limited waveforms, the data rate being a function of a burst-on duty cycle; and means for optically receiving, via the communications path, the data at the selectable data rate, the means for transmitting and the means for receiving being configured to operate as a pair, the dedicated communications path extending an entire distance between the means for optically transmitting and means for optically receiving.

* * * * *